US012414549B2

(12) United States Patent
Ward

(10) Patent No.: US 12,414,549 B2
(45) Date of Patent: Sep. 16, 2025

(54) SYSTEM AND METHOD FOR MODULAR AQUACULTURE

(71) Applicant: Atlantic Aquaculture Technologies LLC, North Falmouth, MA (US)

(72) Inventor: Daniel P. Ward, North Falmouth, MA (US)

(73) Assignee: SCALLOP BAY SHELLFISH COMPANY, LLC, Pocasset, MA (US)

( * ) Notice: Subject to any disclaimer, the term of this patent is extended or adjusted under 35 U.S.C. 154(b) by 528 days.

(21) Appl. No.: 17/633,461

(22) PCT Filed: Aug. 9, 2020

(86) PCT No.: PCT/US2020/045554
§ 371 (c)(1),
(2) Date: Feb. 7, 2022

(87) PCT Pub. No.: WO2021/030237
PCT Pub. Date: Feb. 18, 2021

(65) Prior Publication Data
US 2022/0279764 A1    Sep. 8, 2022

Related U.S. Application Data

(60) Provisional application No. 62/884,769, filed on Aug. 9, 2019.

(51) Int. Cl.
*A01K 61/50*    (2017.01)
*A01K 61/60*    (2017.01)

(52) U.S. Cl.
CPC .............. *A01K 61/50* (2017.01); *A01K 61/60* (2017.01)

(58) Field of Classification Search
CPC ................................ A01K 61/50; A01K 61/60
See application file for complete search history.

(56) References Cited

U.S. PATENT DOCUMENTS

| 5,095,851 | A | * | 3/1992 | Bourg | A01K 61/60 |
| | | | | | 119/223 |
| 5,628,280 | A | | 5/1997 | Ericsson | |
| 9,339,016 | B1 | * | 5/2016 | Donovan | A01K 61/65 |
| 9,655,347 | B2 | | 5/2017 | Troy et al. | |

(Continued)

FOREIGN PATENT DOCUMENTS

| CN | 203929111 U | 11/2014 |
| CN | 103651218 B | 3/2015 |

(Continued)

*Primary Examiner* — Peter M Poon
*Assistant Examiner* — Hae Rie Jessica Byun
(74) *Attorney, Agent, or Firm* — Douglas Denninger

(57) ABSTRACT

A modular aquaculture system, and method of using same, deployable in a body of water having a water column, the system including at least one carrier unit defining at least one chamber in which a plurality of containers can be placed. Each container is capable of holding a plurality of organisms to be cultured, and the chamber has at least one chamber inlet for water intake and at least one chamber outlet. The system further includes support structure having sufficient flotation to suspend the at least one carrier unit in the water column. At least one drive unit actively alters a rate of water flow through the at least one chamber and past the containers.

19 Claims, 15 Drawing Sheets

(56) References Cited

U.S. PATENT DOCUMENTS

| | | | |
|---|---|---|---|
| 10,599,147 B1 | 3/2020 | Rapoport et al. | |
| 10,918,094 B2* | 2/2021 | Sandstad | A01K 61/10 |
| 2005/0034676 A1* | 2/2005 | Taylor | A01K 61/60 |
| | | | 119/219 |
| 2007/0181072 A1 | 8/2007 | Davis | |
| 2010/0018471 A1* | 1/2010 | Murdza | A01K 61/54 |
| | | | 119/240 |
| 2015/0083050 A1* | 3/2015 | Brosh | A01K 61/00 |
| | | | 119/200 |
| 2015/0272018 A1 | 10/2015 | Menard | |
| 2017/0245479 A1* | 8/2017 | DePaola | A01K 61/50 |
| 2019/0116767 A1 | 4/2019 | Depaola et al. | |
| 2019/0274289 A1* | 9/2019 | Leow | B63B 11/04 |
| 2019/0335720 A1* | 11/2019 | Kim | B66D 3/04 |
| 2020/0029536 A1* | 1/2020 | Odlin | A01K 61/60 |
| 2020/0068858 A1* | 3/2020 | Ayers | A01K 61/10 |
| 2021/0259174 A1* | 8/2021 | Nakanishi | C12M 31/08 |

FOREIGN PATENT DOCUMENTS

| | | | | |
|---|---|---|---|---|
| CN | 107094676 A | * | 8/2017 | A01K 61/40 |
| CN | 105075946 B | | 6/2018 | |
| CN | 109076998 A | * | 12/2018 | A01K 61/60 |
| CN | 109984070 A | * | 7/2019 | A01K 61/65 |
| CN | 111084139 A | | 5/2020 | |
| EP | 3466254 A1 | | 4/2019 | |
| IN | 2019-11032201 A | | 8/2019 | |
| JP | 2015-119664 | | 7/2015 | |
| KR | 100745080 B1 | * | 8/2007 | A01K 61/60 |
| KR | 20160074367 A | * | 6/2016 | |

* cited by examiner

SYSTEM AND METHOD FOR MODULAR AQUACULTURE

CROSS-REFERENCE TO RELATED APPLICATION

This application claims priority to U.S. Provisional Application No. 62/884,769 filed on 9 Aug. 2019. The entire contents of the above-mentioned application are incorporated herein by reference.

FIELD OF THE INVENTION

This invention relates to systems and methods of growing shellfish to market size utilizing containers held in a body of water, and more particularly to modular culture units which can be repositioned at different locations on the water.

BACKGROUND OF THE INVENTION

Shellfish aquaculture in the United States has been expanding rapidly which provides an increasing number of jobs, promotes local economies, and yields sustainable protein sources for a continuously growing human population. However, industry growth may be restricted in the future due to several issues which all directly relate to available food, primarily microalgae, for shellfish growth. Restrictions are not necessarily attributable to an overall lack of microalgae available in most coastal and nearshore waters, as eutrophication and anthropogenic impacts have led to excess microalgae in many environments. Instead, a critical issue is being able to deliver appropriate amounts of microalgae to the shellfish in a manner which matches their physiological demands.

Shellfish are currently farmed using methods that are very risky. Risk comes, in part, from the reliance on only nature-supplied water flow, and regular environmental disturbances such as harmful algae blooms (HAB), storms, chemical spill's, and the like that cannot be avoided in the currently practiced, stationary farming systems. Further, the current systems require large amounts of manual labor, and results in taking up large swaths of coastal water bodies which lead to stakeholder conflicts and a lack of space for expansion.

The issue of inefficient culture methods is constant across the industry, and stems from the practice of farming shellfish by having them simply feed from natural microalgae that flows by the shellfish, which is dictated by tidal flow and culture technique. Regardless whether the selected shellfish are mussels, oysters, scallops or clams, there are essentially two primary methods of growing the shellfish to market size: (1) held in some type of gear (bags, cages, lantern nets, longlines, etc.); or (2) bottom planting. While farming using gear is expensive, prone to losses, can lead to user conflicts and can have negative environmental impacts, the main issue is that growing shellfish in gear restricts water flow to the shellfish, and therefore negatively impacts growth and survival. Flow through initially clean 4 mm mesh bags can be reduced by over 90% compared to ambient flow outside the bags; however, as soon as the gear is deployed it begins to accumulate biofouling, which can quickly restrict 100% of the flow if the gear is not tended over time. This causes either high labor costs to tend to the gear on a constant basis, or higher gear costs and lower efficiency to stock shellfish at a lower density, which results in greater land use requirements.

The other primary method of growing shellfish is bottom planting, which provides even lower stocking densities as compared to utilizing gear, requires even greater land use, and exhibits lower survival due to predation and environmental effects. These methods also entail high labor costs to harvest and sort the product.

In order for the aquaculture industry to continue to expand, it would be desirable to switch the culture model from the current laborious, higher-cost and/or lower-efficiency methods, to a low-labor, technologically-advanced technique which will allow for more product to be produced more efficiently in a smaller footprint and with safer, higher-paying jobs as a further result.

SUMMARY OF THE INVENTION

The invention disclosed herein presents a novel system for growing organisms such as shellfish from seed stock to marketable size within a modular platform, where optimized water flow controls desired environmental characteristics, which results in higher densities of cultured organisms, greater yields, higher efficiency and reduced aquaculture risk.

This invention features a modular aquaculture system, and, method of using same, deployable in a body of water having a water column and a natural flow rate of the water, the system including at least one carrier unit defining at least one chamber in which a plurality of containers can be placed. Each container is capable of holding a plurality of organisms to be cultured, and the chamber has at least one chamber inlet for water intake and at least one chamber outlet. The system further includes support structure having sufficient flotation to suspend the at least one carrier unit in the water column. At least one drive unit actively alters the natural flow rate of the water to an adjusted flow rate, such as a selected mechanically powered flow rate, through the at least one chamber and past the containers.

In certain embodiments, the plurality of containers is included in the claimed system, each container defining a plurality of openings through which water can be passed to flow water past the organisms. In some embodiments, the drive unit includes at least one impeller that is positioned to actively force water past the containers to exit from the chamber outlet. In some embodiments, the impeller is positioned proximate to one of the at least one chamber inlet and/or the at least one chamber outlet. In certain embodiments, the direction of water flow is also altered, preferably to flow substantially laterally through the containers and then downward to exit the at least one chamber outlet. The term "impeller" is utilized herein in its broadest sense of increasing or decreasing the rate of flow of a liquid, and includes propellers having one or more blades to serve as the impeller. In certain embodiments, the drive unit includes a motor positioned on the support structure to rotate the impeller.

In a number of embodiments, the support structure includes a lift mechanism capable of raising the carrier unit sufficiently out of the water to expose the containers to the atmosphere above the water column. In certain embodiments, the system is self-propelled and includes a propulsion mechanism such as an outboard motor or inboard motor is capable of moving the support structure and carrier unit to another location on the body of water. In one embodiment, the support structure includes at least one hull having a hull bow that is adapted to be moved across the upper water surface to change an initial operative location of the system to a different operative location.

In some embodiments, at least one sensor monitors at least one environmental parameter in the water column in proximity to the carrier unit, that is, near and/or within the carrier unit. In certain embodiments, a controller that is responsive to the sensor commands the drive unit to adjust the rate of water flow through the containers.

Certain embodiments are referred to as a Modular Aquaculture Production ("MAP") system and method of growing organisms such as shellfish to market size, as the system optimizes existing shellfish aquaculture techniques, while adding additional capacity and optimized culture conditions based on real-time data analysis. More particularly, the invention relates to systems and methods for providing innovative nutrient delivery, mitigation of poor growing conditions, and a safe working platform to establish an efficient shellfish growing system. In certain embodiments, the system can be completely powered by renewable energy, and can utilize wind and solar power to greatly increase shellfish aquaculture production.

In certain embodiments, the containers are removably stackable and are secured as a plurality of stacks within the at least one carrier unit. In some embodiments, at least some of the containers are stackable trays, each tray having (i) a top defining a top opening, (ii) a bottom and (iii) at least one sidewall, with the bottom and the at least one sidewall formed of a mesh material having first mesh size for that tray through which water can flow, and the top defining a majority of its area as the top opening. A mesh size may be selected for each tray based on the size, density and type of shellfish to be placed in that tray. In one embodiment, the system further includes at least one liner adapted to be removably placed in one of the trays through the open top of the tray, and the at least one liner is formed of a material having a second mesh size that is smaller than the first mesh size. In some embodiments, the top of each tray includes a rim formed of the mesh material, and the rim defines the top opening. In a number of embodiments, the trays are adapted to be assembled in at least one stack having at least a top tray and a bottom tray, and further including a removable lid defining a plurality of openings through which water can flow, and the lid being placeable on the top tray to completely cover the top opening of that upper tray in the stack. The system may further include at least one securement mechanism per stack to releasably hold the lid against the top tray and to retain together the assembled trays per stack.

In certain embodiments, the culture modules contain motors which create a consistent water flow past the shellfish and an optimized growing environment by moving water through the system. Given the water manipulation, shellfish can be stocked at a high density from seed through market size, and flow rate and direction can be modified within each culture area. In certain embodiments, the culture modules fit within a larger platform which contains floatation, access to power sources, power controls and storage, water quality sensors, and telemetry equipment to rely critical production information to a monitoring and control software application. In certain embodiments, the platform and modules contain all necessary culture components as a self-contained farm system, the farm system is moveable, and the farming environment can be modified based on desired environmental factors.

This invention also features a method of utilizing a modular aquaculture system deployable in a body of water having a water column with an upper water surface and having a natural flow rate of the water, the method including selecting at least one carrier unit defining at least one chamber in which containers are configured to be placed inside the chamber, with the chamber having at least one chamber inlet for water intake and at least one chamber outlet, and selecting a plurality of such containers, each container defining a plurality of openings having a first average opening size for that container through which water can be passed to flow water past the organisms. The method further includes placing in each container a plurality of organisms to be cultured, such as one or more types of shellfish, and selecting support structure including sufficient flotation to suspend the at least one carrier unit in the water column, and suspending the at least one carrier unit with the plurality of containers therein. At least one drive unit is selected to actively alter the natural flow rate of the water to an adjusted flow rate through the at least one chamber and past the containers. At least one environmental parameter of the water in proximity to the containers is monitored, such as temperature, pH and/or dissolved oxygen, and the at least one drive unit is selectively operated to change the adjusted flow rate as needed to optimize readings of the at least one environmental parameter.

In some embodiments, the natural flow rate is mechanically adjusted to a desired mechanically powered flow rate as the adjusted flow rate. In a number of embodiments, the direction of water flow is also altered, preferably to flow substantially laterally through the containers and then downward to exit the at least one chamber outlet, which is selected in certain embodiments to be disposed in a lower portion of the carrier unit. In certain embodiments, at least one liner is removably placed in one of the containers is selected for that container, the at least one liner being formed of a material having a second plurality of openings having a second average opening size that is smaller than the first average opening size of that container. In a number of embodiments, liners having different second average opening sizes are sequentially placed in a container over time, depending on selected factors such as size ranges and/or growth stages of organisms being raised in that container. In certain embodiments, at least some of the containers are selected to be stackable trays, each tray having (i) a top defining a top opening, (ii) a bottom and (iii) at least one sidewall, with the bottom and the at least one sidewall formed of a mesh material having the first average opening size for that tray through which water can flow, and the top defining a majority of its area as the top opening. In some embodiments, a lid element or a container having an enclosed top is placed at the top of each stack.

BRIEF DESCRIPTION OF THE DRAWINGS

In what follows, preferred embodiments of the invention are explained in more detail with reference to the drawings, in which:

FIG. 6B shows a water temperature graph for incoming and two of the silos; FIG. 6C represents a chlorophyll graph for the same incoming and two silos of FIG. 6B for the previous 72 hrs; and FIG. 6D shows notification that data has not been updated for the previous 30 minutes.

DETAILED DESCRIPTION OF THE INVENTION

Figure 1:
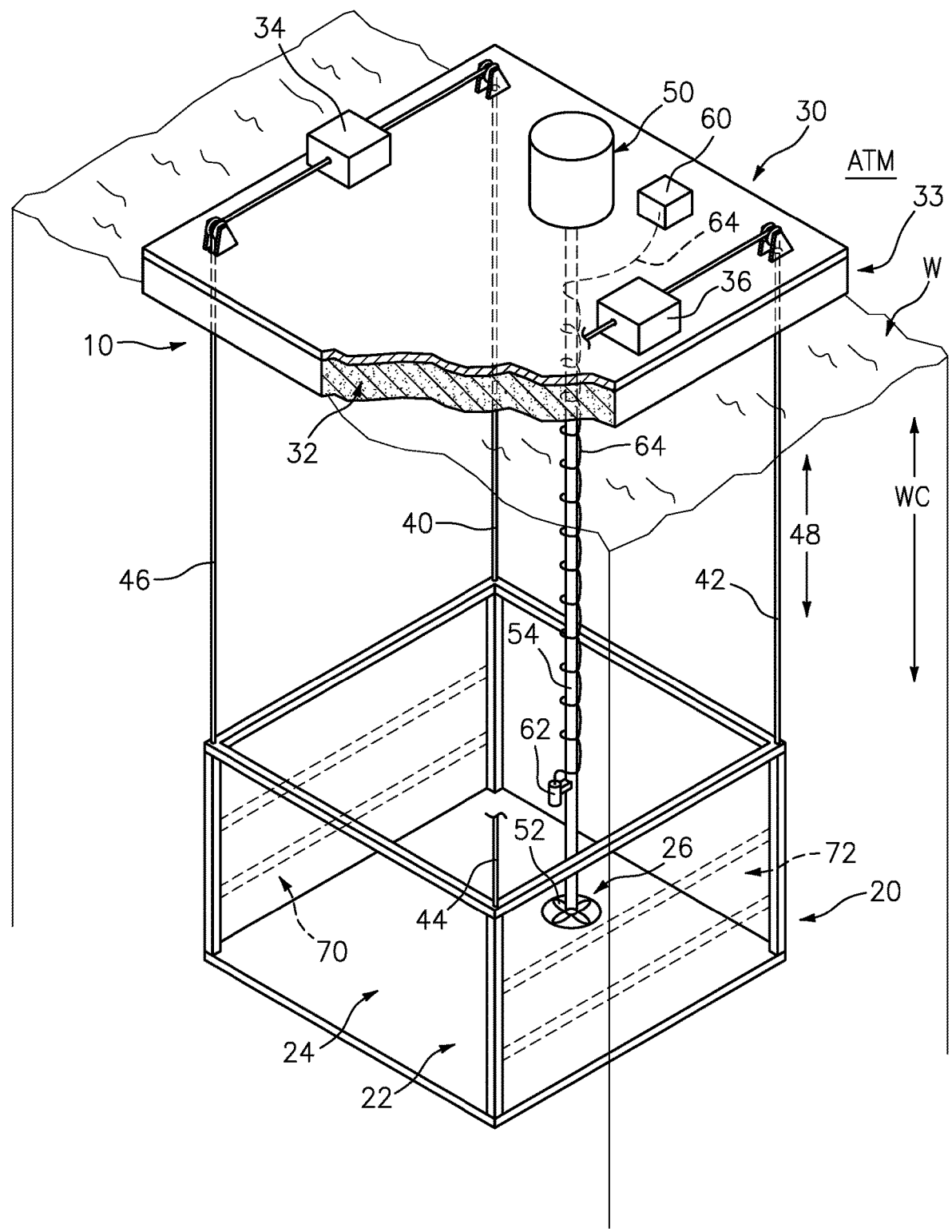
FIG. 1 is a schematic perspective, partial-cutaway view of a modular aquaculture system according to the present invention, with shellfish containers removed for clarity of illustration.

This invention may be accomplished by a modular aquaculture system, and method of using same, deployable in a body of water having a water column, the system including at least one carrier unit defining at least one chamber in which a plurality of containers are placeable. Each container is capable of holding a plurality of organisms to be cultured, and the chamber has at least one chamber inlet for water intake and at least one chamber outlet. The system further includes support structure having sufficient flotation to suspend the at least one carrier unit in the water column. At least one drive unit actively alters a rate of water flow through the at least one chamber and past the containers.

The present invention provides for increased efficiency and productivity of aquaculture, particularly shellfish. The increased productivity is enabled by one or more mobile aquaculture modules, adapted for open-water conditions, with on-demand liquid and nutrient delivery. Typically, five- to ten-times concentrated organism growth and/or density is achieved when utilizing the present invention. Other marketable organisms including vertebrates such as fin fish and plants such as kelp can grown together with or instead of shellfish. The Modular Aquaculture Production (MAP) system of the present invention can produce far more shellfish from a smaller footprint than current typical farms (bottom culture or in gear). The new model will also reduce labor, replacing low-skilled low-pay jobs with higher-skilled higher-paying jobs; reduce risk because it will be able to move to avoid disease, HABs and storms; reduce the amount of land needed so the industry can grow; the system can be out at sea away from user conflicts; no gear or lines in the water to entangle marine mammals; and be completely powered by renewable resources.

Enhancing certain embodiments of the innovative features are a plurality of stackable modular containers such as open-top trays that can be stacked, covered with a lid, and placed within a carrier unit. The combination of one or more carrier units with the plurality of containers is also referred to herein as a growth substrate mechanism. As few or as many modules can be utilized as needed and can be expanded or reduced over time. One particular embodiment may incorporate as few as one module, or as many modules as desired. It is to be understood that one growth substrate mechanism may comprise more than one growth substrate module (also referred to as simply a module). In addition, further improvements are enabled by an environmental sensing mechanism and an information transmission mechanism.

The present invention enables culturing of selected shellfish in stacked trays housed within a partially-enclosed culture module, with a selected mesh size for each tray based on the size, density and type of shellfish to be placed in that tray. In some embodiments, each tray has a first, larger mesh size and at least one liner having a second mesh size that is smaller than the first mesh size is placed into the corresponding tray.

The present invention is well suited for aquaculture production in the water column. The term "water column" is defined as a conceptual column of water from the surface of a liquid body to the bottom of the liquid body, but not including the bottom floor (e.g., the sea-floor). The term "substantially" as utilized herein encompasses deviations of up to ten percent, such as water flow substantially parallel or lateral relative to the surface of a water column being oriented in a direction between 80 degrees to 100 degrees relative to a vertical line to the surface. The present disclosure is chiefly aimed at aquaculture production in the top of the water column that is easily penetrated by sunlight, as opposed bottom floor aquaculture (e.g., current sea-floor-attached aquaculture farms).

The MAP technique controls flow through the modules, and can enhance upwelling (upward flow of water toward the surface of a water column), downwelling (downward flow of water away from the surface) and/or cross-flow, also referred to herein as "lateral flow" when substantially parallel to the surface, that is, substantially horizontal. The upwelling or downwelling flow (and therefore oxygen and microalgae density) preferably is controlled to optimize conditions suited for the shellfish species and density placed in the system. One novel aspect of the MAP technique is growing shellfish at a high density to market size in an environment that is highly controlled, very efficient, and which may be completely powered by renewable power sources.

Nearshore shellfish operations often also use floats to sort shellfish, where workers are exposed to the elements and often results in a dangerous working environment. Creating a large, stable working platform will be safer and more stable for operation. If the conditions worsen significantly, the MAP platform can simply be moved to a calmer area temporarily until the storm subsides. Being in the offshore environment would also be less influenced by anthropological and environmental threats faced by coastal operation, such as changes in salinity, dissolved oxygen, sedimentation and pollution. Movement offshore would help avoid most of the ecological and anthropogenic threats faced by nearshore operations, but harmful algae blooms could threaten the health of offshore shellfish if a bloom migrates through an operation. Harmful algae blooms move with surface currents of the ocean, and blooms occur in both near- and offshore environments, though mobility of an offshore operation could help managers mitigate the effects of harmful algae bloom.

A modular aquaculture system 10, FIG. 1, is shown deployed in a body of water W having a water column WC. The system 10 includes at least one carrier unit 20 defining at least one chamber 22 in which a plurality of containers are placeable as described in more detail below. Each container is capable of holding a plurality of organisms such as shellfish to be cultured, and the chamber 22 has at least one chamber inlet 24 for water intake and at least one chamber outlet 26. In some constructions, at least one side of the carrier unit 20 has a solid wall and, in other constructions, the carrier unit 20 has an open framework to support the plurality of containers while enhancing water flow through the carrier unit 20. Dashed lines 70 and 72 represent optional spacers, struts, tracks or shelves to maintain a desired separation between the containers and/or to add structural reinforcement to the carrier unit 20. The system further includes support structure 30, also referred to herein as a platform, having sufficient flotation 32 to suspend the at least one carrier unit 20 in the water column WC.

In this construction, the system 10 includes a lift mechanism 33 having at least two lift drive units 34 and 36 which are connected to the carrier unit 20 by lift lines 40, 42, 44 and 46 to raise or lower the carrier unit 20 as indicated by arrows 48. Lift lines 40-46 in certain constructions are water-resistant ropes, wire cables, chains, rails, rods or other structure according to the overall weight of the carrier unit 20 and the selected configuration of the support structure 30. Preferred embodiments have a lift mechanism that is capable of raising the carrier unit 20 above the upper water surface and sufficiently out of the water W to expose the containers to the atmosphere ATM above the upper water surface of the water column WC, as described in more detail below.

At least one drive unit 50 actively alters the natural flow rate of the water to an adjusted flow rate of water flow through the at least one chamber 24 and past the containers therein. In this construction, the drive unit 50 includes at least one impeller 52 that is positioned in the chamber outlet 26. The term "impeller" is utilized herein in its broadest sense of increasing or decreasing the rate of flow of a liquid, and includes propellers having one or more blades to serve as the impeller. The drive unit 50 includes a motor positioned on the support structure 30 to rotate the impeller 52 via a drive shaft 54. In certain constructions, the natural direction of water flow is also altered, preferably to flow in a direction that is substantially lateral (horizontal) through the containers and then downward to exit the at least one chamber outlet, which is selected in certain embodiments to be disposed in a lower portion of the carrier unit such as illustrated in FIG. 1.

Also in this construction, a controller 60 includes a microprocessor that communicates with at least one sensor 62, electrically connected by wire 64 to controller 60 in this construction, that monitors at least one environmental parameter in the water column WC in proximity to the carrier unit, that is, near and/or within the carrier unit 20, such as temperature, dissolved oxygen, pH, or other parameter as described in more detail below. In other embodiments, one or more of the sensors 62 are wirelessly connected to controller 64 and/or to a smart phone, tablet computer, or other device having Bluetooth or other wireless communication capabilities. In certain embodiments, the controller 60 responds to sensor readings to command the drive unit to adjust the rate of water flow and/or commands the lift mechanism 33 to raise or lower the carrier unit 20 within the water column WC. In some construction, controller 60 is in a water-resistant housing and, in other constructions, the housing is waterproof to a depth of at least ten feet.

Modular Growth Substrate Mechanism

The present invention provides for an aquaculture growing space, herein referred to as the growth substrate mechanism. This mechanism is modular, and may comprise multiple modules in one embodiment. The physical manifestation of the mechanism may be different between embodiments, and may comprise different physical components in a single embodiment (e.g., a combined tray and bag system in one embodiment). For the purpose of this disclosure, the growth substrate mechanism is referred to interchangeably as the growth substrate mechanism, a growth substrate module, a module, and as part of a modular aquaculture production (MAP) system or farm.

The present invention uses a self-contained growth substrate module system, instead of obtaining juvenile shellfish (~1" shell height), placing 500 juveniles into a polyethylene bag, conventionally floating the bag on the surface, clipping the bag to a line and then doing that same action many, many, more times. The present invention enables the farmer to optimize the environmental conditions for the best growth and survival depending on the species being grown, whereas current practice is at the mercy of the external environment at the farm location. This optimization provided by the present invention enables hitherto unachievable growing concentrations of more than 5 times (5×) the concentration of organisms used in aquaculture farming. Since all of the shellfish are within one or more MAP structures, the conditions surrounding the entire farm can be manipulated at any time, as needed. If there is a harmful algae bloom nearby or a storm coming, the farmer can either direct water from deeper waters with lower cell densities to the growth substrate modules, or simply move the MAP farm to a new location.

The inventive system further enables a mobile growth substrate mechanism. The growth substrate mechanism is configured to move, or be moved, into and out of the aquatic environment. In other words, the system is configured to expose the growth substrate mechanism to the aquatic environment and the above-aquatic environment (e.g., the air or space immediately above the water). During the majority of growth operations, the growth substrate mechanism will be immersed in the aquatic environment. However, many operations (seeding, thinning, harvesting, cleaning, treating, and etc.) require the growth substrate mechanism to be removed from the aquatic environment to be more accessible and/or isolated from the water column.

In most currently preferred embodiments, the growth substrate mechanism modules are configured to be raised and lowered in and out of the water by rails or other guides built into the supporting structure to stabilize each module as it is moved relative to the support structure. At least one locking mechanism is provided to secure each module once its desired position is achieved, either in or out of the aquatic environment. In further embodiments, the growth substrate mechanism is fixed in location, but the support structure, or the system as a whole, is manipulated such that the fixed growth substrate mechanism becomes immersed or removed from the aquatic environment. One specific embodiment of such a system is a variable buoyancy supporting structure that decreases its buoyancy to lower the whole system, resulting in growth substrate mechanism immersion in the aquatic environment.

Systems and methods according to the present invention are vastly more efficient per occupied area or volume as a farm, and would allow for greater investment in aquaculture, as a farm utilizing the present invention is now an asset which has a consistent, controllable level of production. In conventional place-based aquaculture, there are no assets because the lease under water is not guaranteed, and in many cases cannot be sold or transferred. By comparison, a mobile system according to the present invention is well suited for private ownership, and can be individually permitted as a floating operation, much more similar to a fishing vessel permit but without the uncertainties experienced by conventional fishers. This enables transferability of permits and assets, and lowers barriers to entry for those becoming established in the aquaculture industry. Other benefits of utilizing the present invention include: (i) enhancing labor requirements, replacing low-skilled, low-pay jobs with higher-skilled, higher-paying jobs; (ii) reducing risk because the present invention will be able to move to avoid disease, harmful algae blooms and storms; (iii) reducing the amount of land needed so the industry can grow; (iv) enable placement out at sea away from user conflicts; (v) reduction or elimination of no gear or lines in the water to entangle marine mammals; and (vi) suitable for at least partial to complete powering by renewable resources during operation.

Growth Substrate Mechanism Design

The invention disclosed herein provides a highly controlled, intensive modular aquaculture production system, which is large enough to house all of the shellfish from 1 mm seed through final growout. The MAP system is comprised of three main aspects: 1) the growth substrate module, 2) the supporting structure, and 3) liquid delivery mechanism such as drive system with an impeller. Further embodiments incorporate additional innovative components, such as environmental monitoring and control at the growth site and remote monitoring and control systems. The growth substrate mechanism, referred to as the module for simplicity, is the area where the shellfish are grown, which is designed for optimal growing conditions for selected organisms (e.g., generally-sessile organisms like oysters, mussels, clams or scallops, though it can be expanded to additional species). The supporting structure, also referred to herein as a platform, includes the apparatus surrounding and supporting the module, including flotation, power storage and supply, and staging areas. In some constructions, the environmental monitoring and control system includes at least the in-water sensors to monitor conditions within the modules and, optionally, within the power and flotation systems of the platform. In some embodiments, the environmental monitoring system autonomously controls conditions in the farm and, in other embodiments, the monitoring system enables a remote farmer to control the conditions, in conjunction with the information transmission equipment.

Figure 2A:
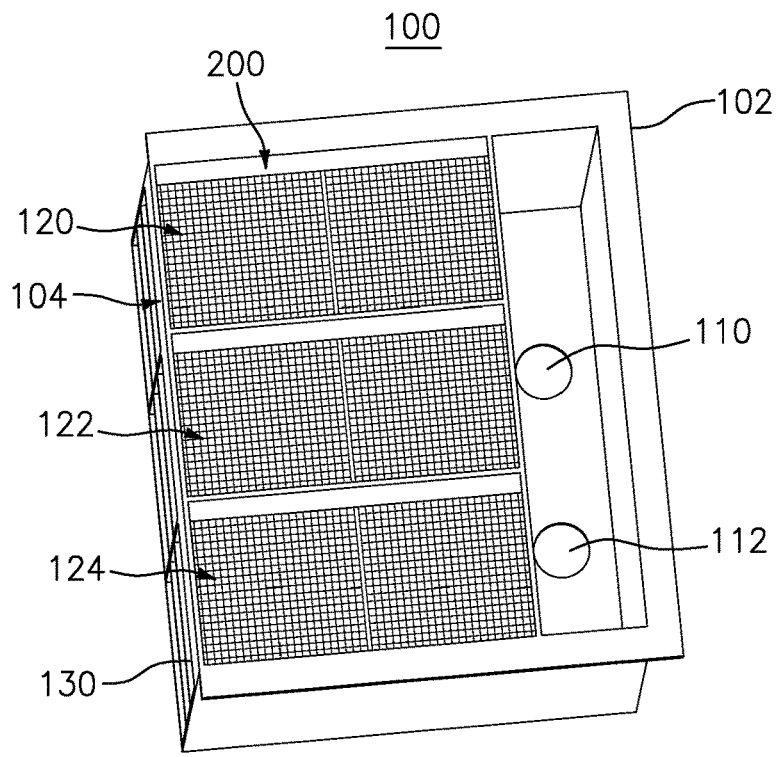
FIGS. 2A-2B are schematic upper front and upper rear perspective views, respectively, of one embodiment of a module according to the present invention having a plurality of shellfish containers stacked within a carrier unit.
Figure 2B:
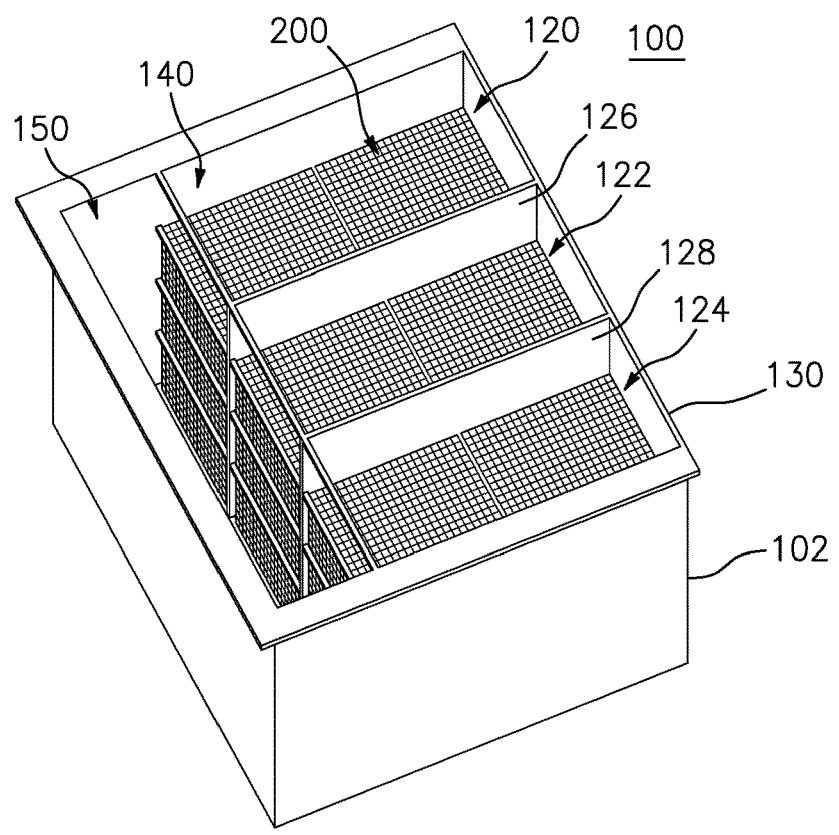
Figure 2C:
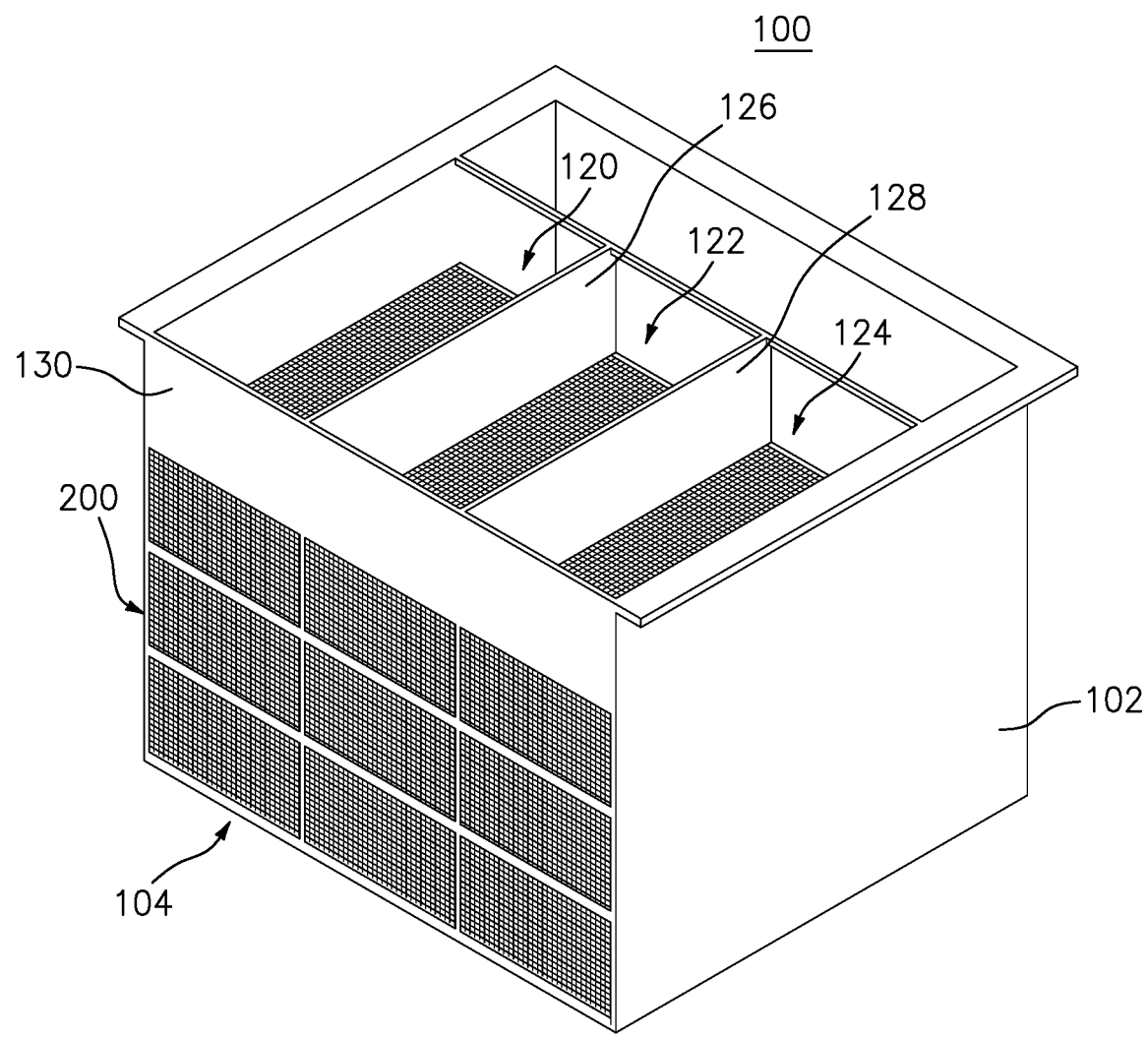
FIG. 2C is a schematic perspective front view of the module of FIGS. 2A-2B with all three culture areas stocked with a plurality of trays as shellfish containers, with a gate lowered to the top tray level to force water flow through the trays and not above or around the shellfish.

The growth substrate module, such as module 100, FIGS. 2A-2C, can be modified in many different ways depending on environmental characteristics or farm preferences of a specific embodiment. In one construction, the growth substrate module is constructed from ¼" marine-grade aluminum plating (all module design units US Customary Units due to supplier standards), with all junction points shown professionally welded (A1A Steel, East Falmouth, MA). Preferably, the module is designed to be left in the water for extended periods of time. In constructions where the liquid delivery mechanism motor is not normally submersed, the module exterior should only be required to be removed from the water once annually for zinc repair and non-toxic antifouling coating application.

FIGS. 2A-2B are schematic top and upper rear perspective views, respectively, of one embodiment of a module 100 according to the present invention having a plurality of shellfish containers 200 stacked within a carrier unit 102. FIG. 2A is a view of module 100 from above, with front opening 104 to the left-hand side. One or more pumps will direct fluid flow downward through holes 110 and 112 visible on the right-hand side. In this construction, three bays or culture areas 120, 122 and 124 are established by dividers 126 and 128. Each bay 120, 122 and 124 holds two tray packs, such as tray pack 300, FIG. 3, having six trays 310, 312, 314, 316, 318 and 320 in one construction. Typically for module 100, each tray pack is formed of five to twenty trays plus a cover lid, as described in more detail below. Each tray serves as a shellfish container within the culture area.

A fully completed front view of module 100 is schematically illustrated in FIG. 2C. All three culture areas 120, 122 and 124 are stocked with 30 trays each (90 total trays for module 100 when each tray pack is formed of fifteen trays each) to optimize occupancy of each culture area. Each culture area has at least one gate 130, either a single elongated barrier in one construction or, in other constructions, with one or more independently moveable barriers per culture area 120, 122 and 124. During culture of organisms, the one or more gates 130 are lowered to the top tray level to force water flow through the trays 200 and not above or to the sides of the shellfish contained therein.

In some embodiments, the growth substrate mechanism is configured to be removed from the external environment on a regular basis (e.g., weekly or daily). In other embodiments, the growth substrate mechanism is not configured to be removed from the external environment. In these embodiments, the system is most often secured to an external support structure (e.g., a dock) and is accessed either by an in-water user or at low tides when the system is exposed or partially exposed above water.

In one construction, the exterior walls of carrier unit 102 are 7 ft high, though only 5 ft are useable for culture space to account for 2 ft of platform flotation freeboard and 2 ft gates 130 in this construction. The standard module measures 9 ft W×8 ft L, with the bottom solid, the top open, and three out of the four sides constructed from aluminum. The module has two vertical aluminum plates 126, 128 running from the open side to 6 ft into the module, which are secured on both side to the walls every 1.75 ft with three-inch aluminum cross-members 140, FIG. 2B. This creates the three separate culture areas 120, 122 and 124, each which measure 6 ft L×3 ft W×5 ft H, and an open space 150 behind the culture areas which measures 2 ft L×9 ft W×7 ft H (5 ft of which is below water). The culture areas are stocked with trays one-inch smaller in width than the culture areas (35 in), which leaves ½" of space on all side of the trays.

Figure 3:
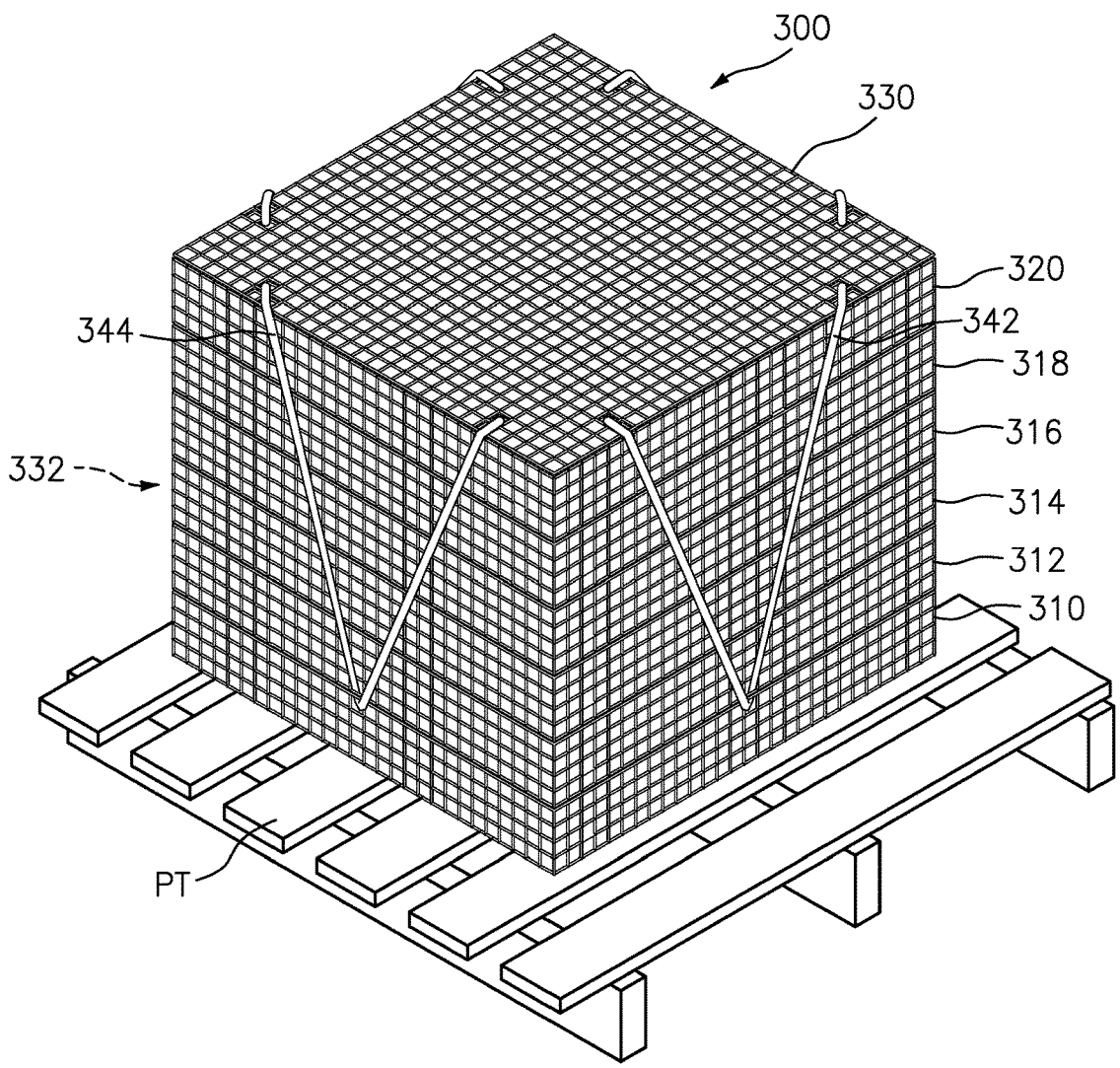
FIG. 3 is a schematic perspective view of a growth substrate mechanism utilizing a "tray pack" as shellfish containers, with six trays and an upper lid comprising the tray pack in this embodiment.

In one construction, each culture area can fit two tray packs such as tray pack 300, FIG. 3, each of which has fifteen stacked trays, each tray formed of one-inch wire mesh and being 35 in long×35 in wide×4 in high, for a total of 30 trays per culture area, and 90 trays per module. Tray pack 300 as illustrated in FIG. 3, resting on pallet PT, has six trays 310, 312, 314, 316, 318 and 320 which are secured together with an upper lid 330 by cords such as shock cords 342 and 344. As discussed below for liner 390, FIG. 3C, one or more optional liners 332, FIG. 3, having smaller mesh sizes can be added or exchanged per tray according to the present size of organisms to be cultured in that tray relative to the exterior mesh size of that tray.

Figure 3B:
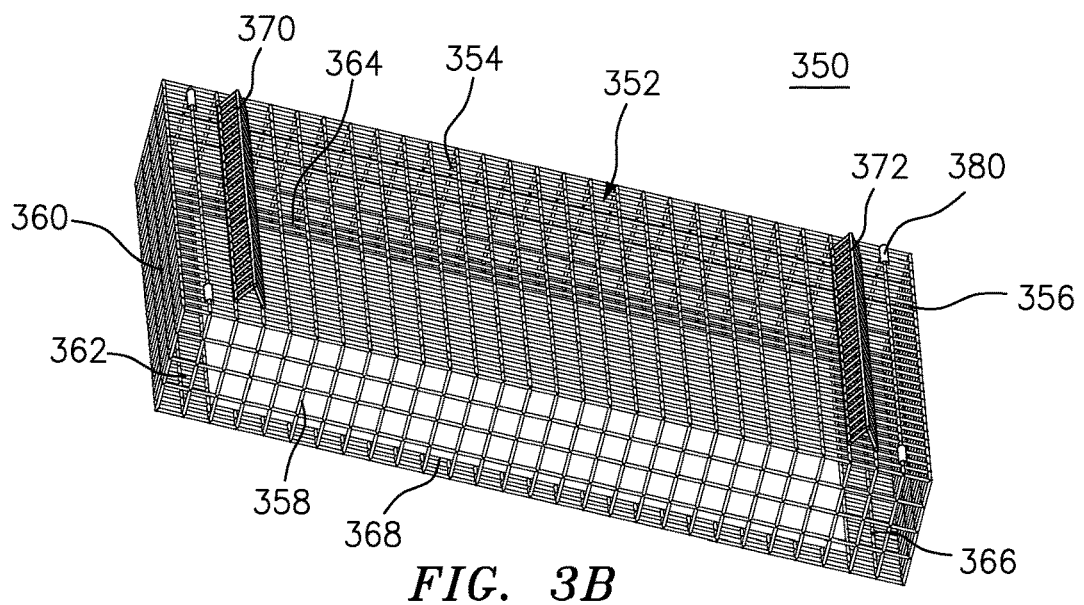
FIGS. 3B-3C are schematic perspective bottom and top views, respectively, of a single tray from the tray pack of FIG. 3, with FIG. 3C showing a replaceable liner being placed in the tray.
Figure 3C:
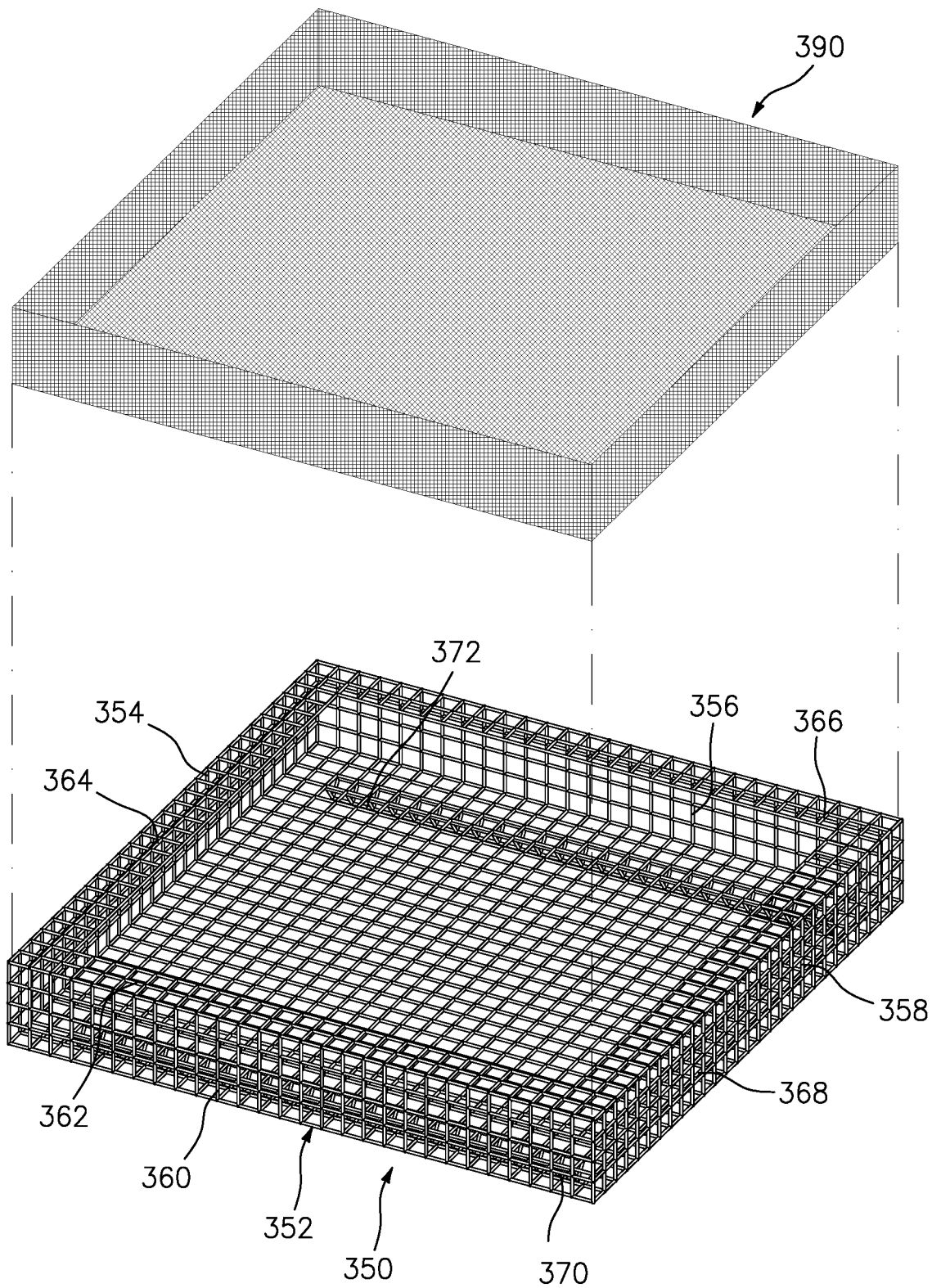

A single tray 350 is shown in FIGS. 3B-3C formed, in this construction, of one-inch wire mesh as a bottom tray floor 352 plus tray sides 354, 356, 358 and 360. In this construction, additional wire mesh material has been utilized to establish a plurality of upper rims 362, 364, 366 and 368 upon which other trays can rest when stacked as a tray pack. Preferably, at least two upper rims or other upper supporting structure are formed to enable stacking of trays. In this construction, the exterior side of bottom tray floor 352 further includes three-sided cross-members 370 and 372 which add structural support to tray 350 and separate it by a set distance from a tray immediately below it when stacked into a tray pack, that is, members 370 and 372 serve as spacers in certain constructions. In some constructions, cross-members 370 and 372 serve one or more of the following functions: stand-offs or spacers between trays; interlocks and/or alignment features between trays; and/or structural reinforcements to bottom tray floor 352 as beams or struts. Crimp sleeves 380 secure junctions of wire mesh and/or cross-members 370 and 372; cable ties or other fasteners are utilized in other constructions. In certain constructions, one or more of cross-members 370 and/or 372 are secured within tray 350, either against the inside of floor 352 and/or touching opposing sides of the tray 350.

A liner 390 is shown in FIG. 3C being placed into the tray 350. In certain constructions, at least one liner adapted to be removably placed in one of the containers, such as a tray, and is selected for that tray according to the current size and type of organism that the farmer decides to grow in that tray at that time. The at least one liner is formed of a material having a second plurality of openings having a second average opening size that is smaller than the first average opening size of that tray. In a number of embodiments, liners having different second average opening sizes are sequentially placed in a container over time, depending selected factors such as size ranges and/or growth stages of organisms being raised in that container. Each tray may have its own first average size of openings; in other words, a single tray pack may have different types of trays and/or organisms selected to grow in each tray.

Figure 4:
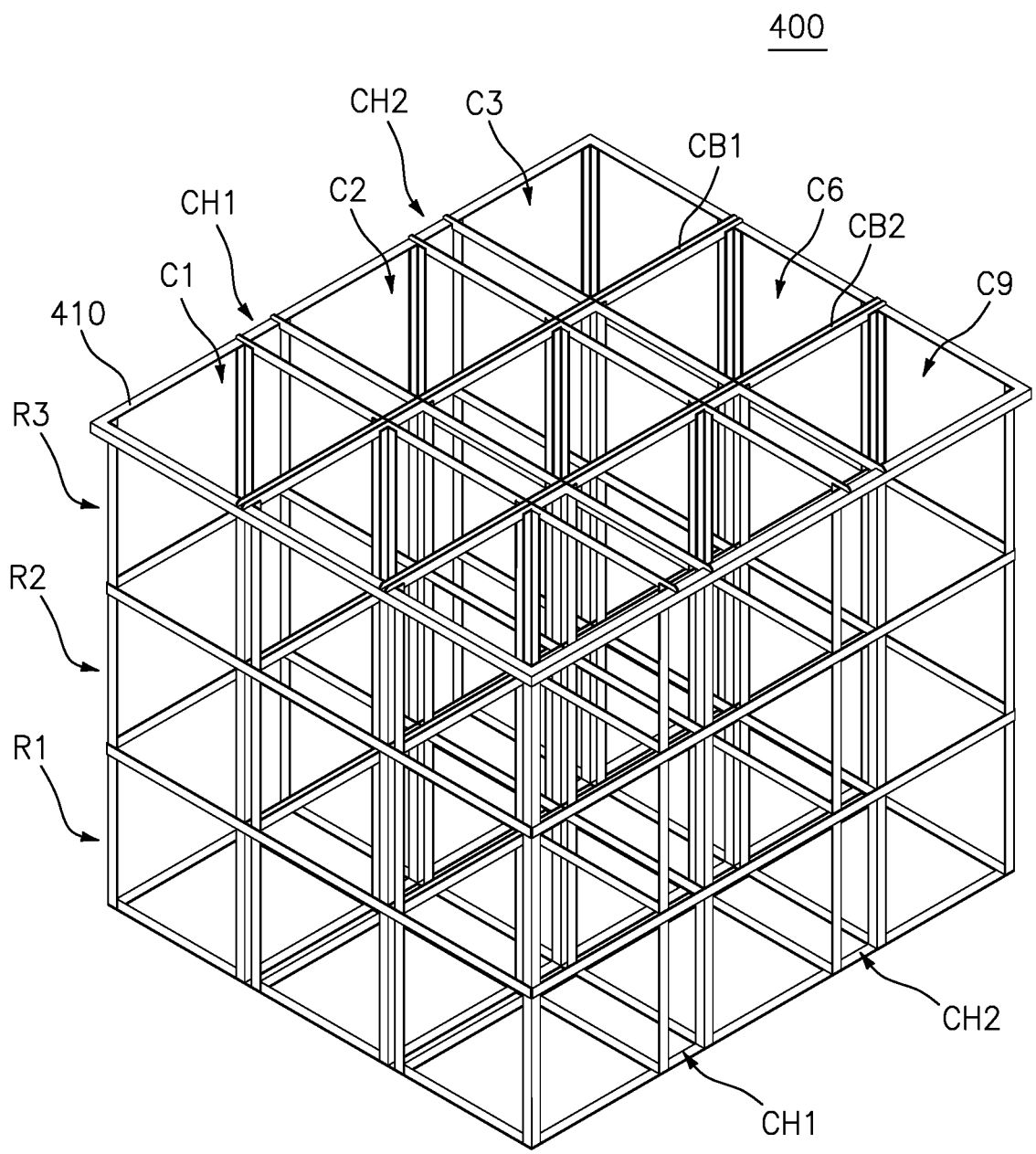
FIG. 4 is a schematic top perspective view of an alternative module according to the present invention having an open-frame structure.

An alternative module 400 according to the present invention, FIG. 4, has an open frame structure which defines rows R1, R2 and R3 with columns C1, C2, C3, . . . C9 in this cubical construction. Exterior frame 410 is reinforced by cross-bars such as CB1 and CB2. Two circulation channels CH1 and CH2 are provided in this construction to provide additional fixed spacing for at least one side of each container, with the center containers having a channel established along two sides of each center container. All of the open outer walls of module 400 serve as inlets for surrounding seawater when immersed in the ocean to enhance natural water flow with selective augmentation by drive unit 450, FIG. 4B, to optimize growth parameters.

Figure 4B:
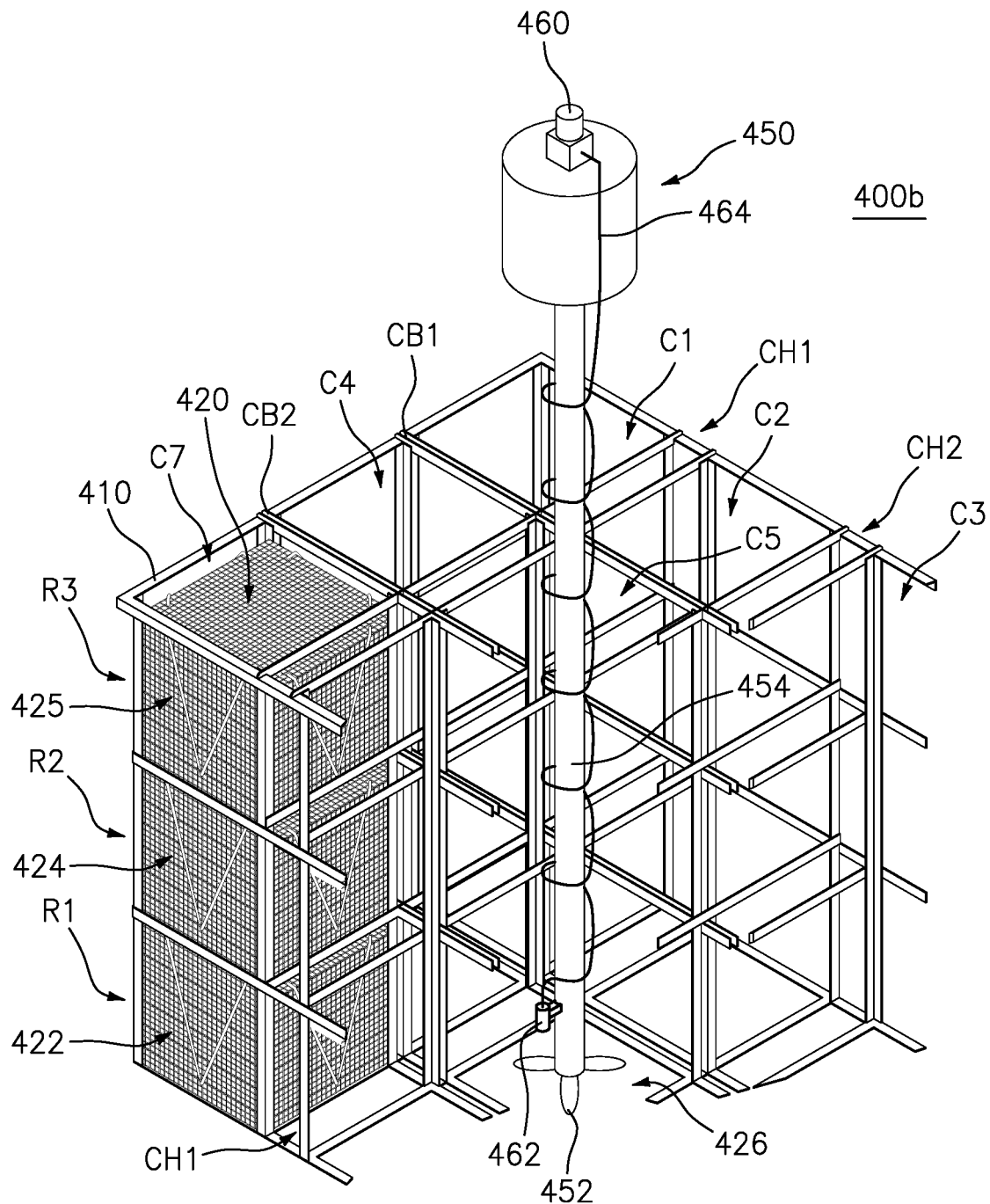
FIG. 4B is a partial cross-sectional perspective view of the module of FIG. 4 plus a drive unit and sensor positioned in the center column of the module.

Drive unit 450, FIG. 4B, is positioned in column C5 of the open-framed module 400b and includes at least one impeller 452 that is positioned in the chamber outlet 426 and is rotated via a drive shaft 454. A controller 460, shown mounted on the motor housing of drive unit 450 for ease of illustration, includes a microprocessor that communicates with at least one sensor 462, electrically connected by wire 464. In certain constructions, the natural direction of water flow is altered at least one, preferably to flow substantially laterally through at least some of the containers and then downward to exit the open bottom of column C5 which serves as the at least one chamber outlet 426 in the lower portion of the carrier unit 400b.

For ease of illustration, a single container column 420 indicates tray packs 422, 424 and 425 within column C7. In some constructions, each tray, also referred to as a cage or container, has a selected stocking density, which can be selected based on mesh size and cage dimensions. In certain constructions, a range of stocking densities are utilized in ½" mesh cages and/or ¾" mesh cages. One or more smaller-mesh liners or bags may also be placed on the bottom and/or the surface of the carrier unit and/or placed in one or more of the trays in each tray pack. In certain constructions, selectable mesh sizes range from 4 mm through 20 mm for all sizes of shellfish from 30 mm through 75 mm. It should be understood that the internal components of the growth substrate mechanism (e.g., trays) are configured to be individually removable from the module in some embodiments, and liners can be added or exchanged per tray as desired. In other embodiments only tray packs are removable from the overall module, and, then individual trays are accessed after removal of that tray pack from the module.

It is understood that in different embodiments, the physical dimensions of the module may be constructed to suit the needs of the cultured organism, the demands of the environment, the needs of the user, or a combination thereof. Other marketable organisms including vertebrates such as fin fish and plants such as kelp can grown together with or instead of shellfish, with cage dimensions and mesh size selected accordingly.

Liquid Delivery Mechanism

Another key part of the present invention is the delivery of liquid and other positive growth conditions (e.g., nutrients) to the growth substrate. Increased growth rates and densities cannot be achieved without replenishment of the ideal growth conditions. Therefore, the present invention provides for a liquid delivery mechanism to actively direct or otherwise manipulate liquid to the module. In the currently preferred embodiment, the liquid delivery mechanism is configured to pull water from the external aquatic environment and direct it over and/or through the module. The liquid delivery mechanism is configured to be in close proximity to the growth substrate mechanism, and is attached to the system by the supporting structure in preferred constructions.

The liquid delivery mechanism may comprise any suitable mechanism or system as known in the art capable of moving liquid from at least one source to at least one target location. In the currently preferred embodiment, as described in more detail below, the liquid delivery mechanism comprises a pump (a motor, a drive shaft and a propeller to serve as an impeller) for pumping the external, aquatic environment to and across the growth substrate mechanism. In some embodiments, the liquid delivery mechanism further comprises an adaptable sourcing mechanism, which is configured to change the source of the liquid driven to the modular growth substrate. In the currently preferred embodiment, the sourcing mechanism comprises an extendable hose that is capable of pulling liquid at least 1 m depth, 3 m depth, 10 m depth, 100 m depth, and in close proximity to the fluid body-bottom. In other embodiments, the sourcing mechanism is configured to get liquid from areas lateral to the system, at least 10 m, at least 20 m, at least 50 m, and at least 100 m laterally distant from the system.

Most often, the liquid delivery mechanism is configured to drive liquid from the aquatic environment to the growth substrate mechanism at an altered flow rate relative to the natural flow rate in the aquatic environment. Generally, the liquid delivery mechanism supplements (that is, increases or augments) the natural flow rate, although in some circumstances it can override a natural flow rate and/or natural direction of flow. The liquid delivery mechanism may also be configured to move liquid away from the growth substrate mechanism. In some situations, the liquid delivery mechanism can be configured to direct liquid from sources other than the external environment (e.g., a tank or reservoir), or to mix liquid from the external environment and from another source or sources.

One example of such mixing would be to add a key growth element to the manipulated liquid. Another example would be to deliver a medical treatment to the module, while the module remained immersed in the external environment. Other substances may be directed to the growth substrate mechanism by the liquid delivery mechanism. In one particular embodiment, the liquid delivery mechanism is configured to heat the water directed at the growth substrate mechanism.

In one construction according to the present invention, two one-foot diameter outlet holes are defined within a lower portion of a module, such as by cutting holes to form outlets 110 and 112, FIG. 2A, with housing brackets installed proximate to the edge of each hole. These two openings are each configured to accept a liquid delivery mechanism, which in one construction includes a propeller, attached to a 7 ft long drive shaft, extending above the water surface to a ⅓ hp 24 VDC motor. In one construction, each liquid delivery mechanism is capable of moving over 3,400 L/min of water substantially laterally through containers within the module and through an outlet. When the pumps are activated, the propellers will spin within the aluminum brackets found in the rear of the module. The pumps will direct flow down toward the ocean bottom, which will ensure the support structure will not exert any lateral pressure, while maintaining zero head for optimal efficiency. Pumping water down and out of the module will force water to flow substantially laterally through the tray packs in order to each the area behind the shellfish where the pumps are located. Each module has a six-inch lip surrounding three sides of the module for mounting purposes within the floatation and power control platform (FIGS. 2A-2C). In many of the embodiments, the liquid delivery mechanisms are directionally controllable, such that the mechanism can reverse the flow of liquid and/or change the angle of moved liquid.

In certain constructions, the modules have one or more adjustable gates located on the front, so that a farmer can change the direction of water flow, and under standard operation, force water to flow through the module, and not around or above the shellfish. The biological feasibility of stocking at higher densities through market size is demonstrated herein, and a lack of food depletion given the chlorophyll data, and no reduction in growth rate when oysters were stocked at the 10× density, indicates that more shellfish can be produced in the system. The current disclosure allows for increased production relative to pumping efficiency, and in the currently preferred embodiment, water will flow laterally over 90 trays, with all trays stocked at either 10× oysters or 5× bay scallops, and the pumping rate will be increased by switching the ½ hp Ice Eater pump to 2, ⅓ hp 24 VDC electric motors per module, which are much more efficient, will produce approximately 3,400 L per minute, and will allow for economically viable production.

In one working construction, a system according to the present invention was positioned in a marina slip, which provided consistent power from shore facilities, and the dock provided support flotation. At commercial scales, the innovative MAP system can be 50' *LOA* and above, which is too large for many marina locations during peak usage months but which may increase the seaworthiness of the platform. Additionally, one benefit of the MAP system is that it can be located further from shore, given the robust nature of the platform, the ability to generate all power required, and without a need for constant in-person supervision. Ideally, there will be two-to-three locations where a particular MAP system will be located. Two of the locations preferably will be away from shore in more exposed locations where the system will be moored from May-October; one location will be the primary location, the second location will be available in times when there are environmental circumstances that require moving the system (storms, harmful algae blooms, chemical spills, etc.). The third location will be in a sheltered area (marina, dock, pier, etc.) where the system can be moored from for at least portions of the year (e.g., November-April in New England), when dock usage is minimal, infrastructure is underutilized, and shoreside power can compensate for any lost renewable production from the shorter winter day length.

Figure 5A:
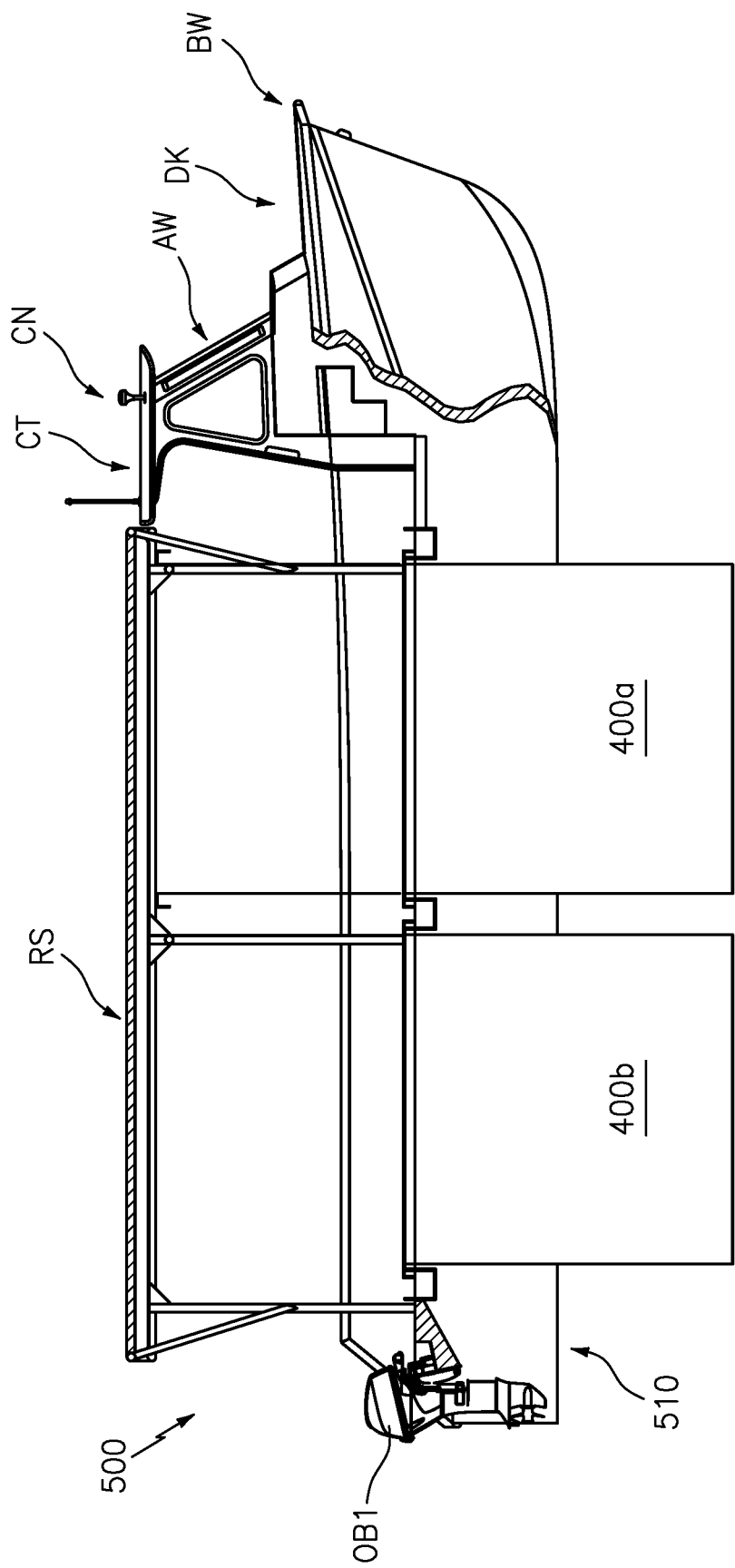
FIG. 5A is a schematic partial side cross-sectional side view, along centerline CL of FIG. 5B, of a 32-foot catamaran vessel as one embodiment of a platform for a mobile aquaculture system according to the present invention carrying two modules according to the present invention, provided with a roof structure suitable for carrying solar panels or other equipment, and having removable outboard engines.
Figure 5B:
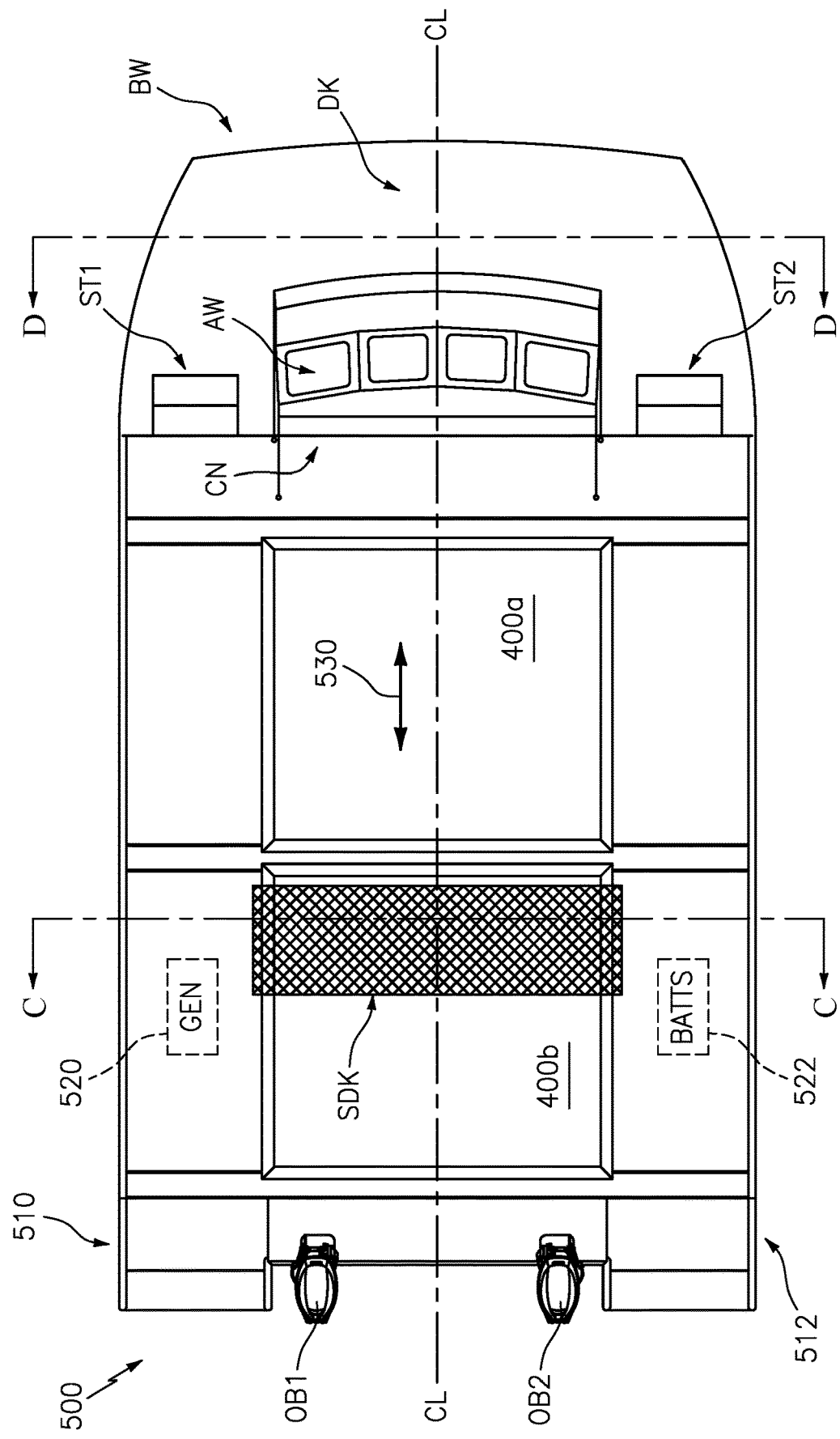
FIG. 5B is a schematic top view of the vessel of FIG. 5A with the roof structure omitted, showing a rolling service deck and two hulls for carrying equipment including batteries and a generator.
Figure 5C:
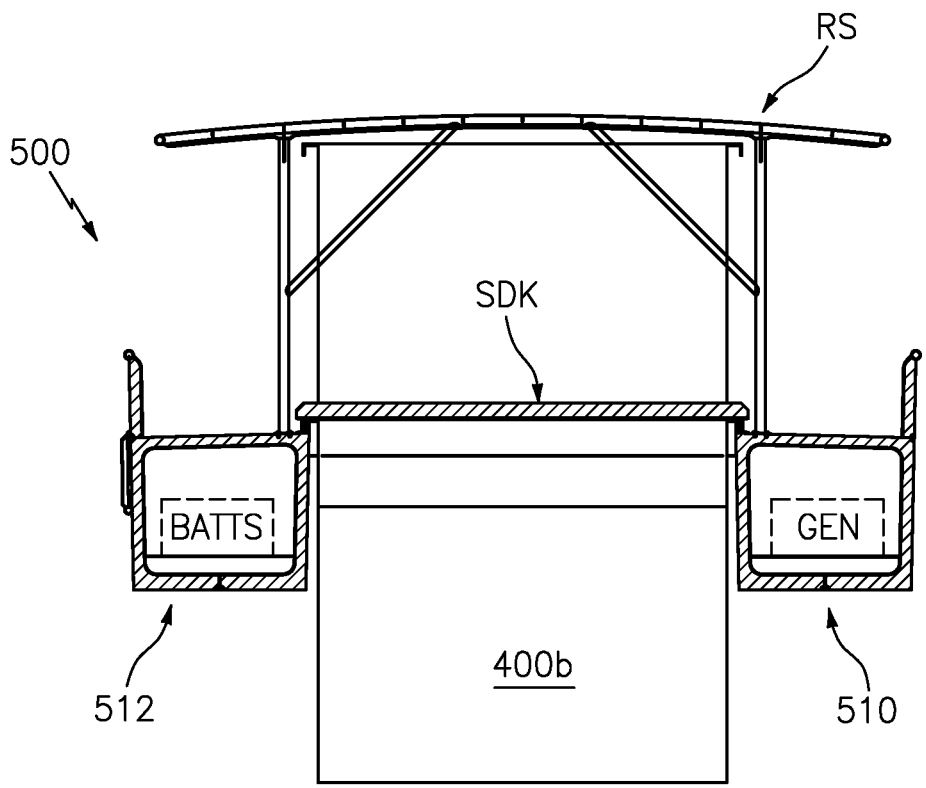
FIG. 5C is a schematic cross-sectional elevational view directed rearward along view lines C-C in FIG. 5B.
Figure 5D:
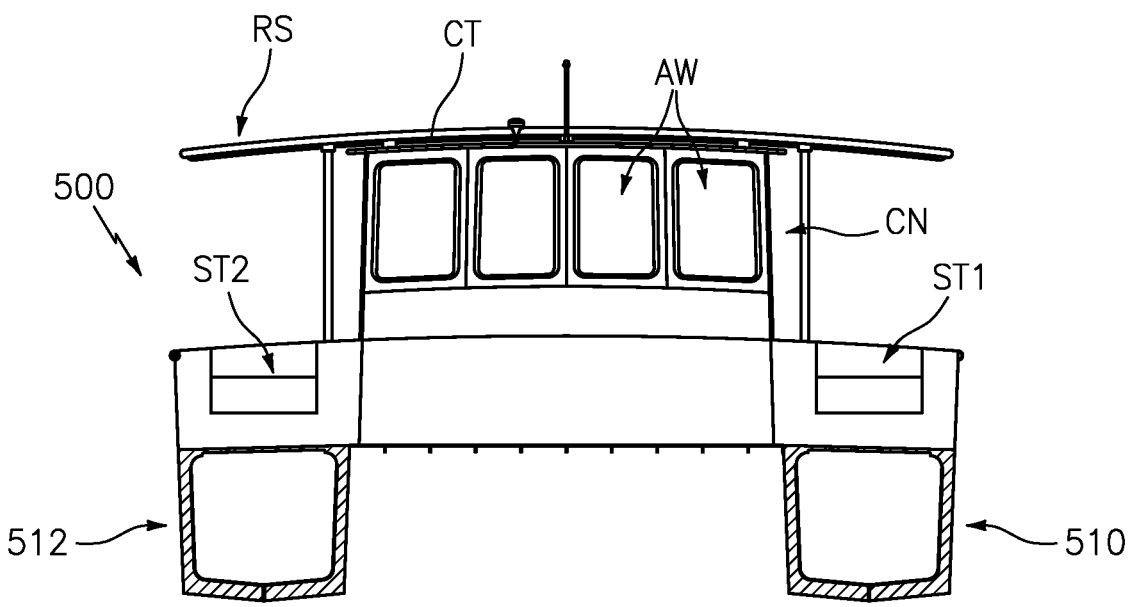
FIG. 5D is a schematic partial cross-sectional elevational view of the cabin and bow deck along lines D-D of FIG. 5B.

In the currently preferred embodiment, the platform is designed as a catamaran 500, FIGS. 5A-5D, to carry two modules 400, FIG. 4, shown as modules 400*a* and 400*b* in FIGS. 5A-5C. Module 400*b* is also shown schematically in FIG. 4B with drive unit 450.

Catamaran 500 has two self-contained hulls 510, 512 which support a cabin CN with acrylic windows AW and cabin top CT. Each hull 510, 512 has a hull bow that is adapted to be moved across the upper water surface to change an initial operative location of the system to a different operative location. At the stern (rear) of each hull 510, 512 is an outboard motor OB1, OB2, respectively, which are removable in certain constructions. A walking deck DK is located on catamaran bow BW, which spans the hulls 510, 512 to provide a walkable surface, with stairs ST1 and ST2 leading to working decks above each hull 510, 512.

A rolling deck member SDK, also referred to herein as sliding deck SDK, FIGS. 5B and 5C, is slidably mounted on horizontal tracks that enable it to be moved fore and aft (to the front or rear) of catamaran 500 as indicated by directional arrow 530. In some constructions, casters or other revolving elements mounted to the underside of the sliding deck SDK enable low-friction movement above the modules 400*a*, 400*b* and, in other constructions, pads of nylon or other low-friction material enable movement. In certain constructions, a locking member is provided to releasably secure the sliding deck in a selected working position. One or more generators 520, FIGS. 5B-5C, and energy storage batteries 522 are examples of equipment that can be carried in one or both of the hulls 510, 512. Solar panels and/or wind generators can be placed on roof structure RS as desired for energy generation.

An alternative, four-module construction demonstrates the modular nature of the present invention which enables scalability per platform, with larger platforms typically increasing operational efficiency. In one alternative construction, a four-module platform is 47' LOA (Length Over All), which is manageable for the small-scale shellfish aquaculture industry in New England, for example. While the platform requirements are simple to include flotation, working space, and power supply and storage, coastal stakeholders may request a certain aesthetic appeal, regardless of functionality. The expansion of MAP systems according to the present invention will rely on the social acceptability of aquaculture in these new locations when the system will be moored at a particular location for many months.

Supporting Structure

The present invention provides for component support and connectivity with the supporting structure. The system is designed for open-water, in water column operation, and not necessarily permanently anchored in one location. The support structure provides at least a physical construct to contain and/or suspend the growth substrate mechanism and the liquid delivery mechanism, as well as carry the optional sensing mechanism and information transmission mechanism, if included in an embodiment. The supporting structure also provides floatation to the system, if utilized.

In self-propelled, mobile embodiments, the supporting structure further comprises at least one type of propulsion mechanism, which enables movement of the system. In other constructions, the system can be towed or pushed by another object (e.g., a separate vessel) over the water to a new location on the water.

In one alternative construction, the supporting structure includes a catamaran hull, a pilot house forward, a Chesapeake deadrise-style roof over the deck where solar panels and wind turbines are located, and space for four modules, with sliding decks, sliding gantries and chain-falls for raising the shellfish or modules. In principle, a module could be located within a platform that was made of wood with polyethylene flotation similar to a standard dock. However, one of the primary advantages of the MAP system is that it can be located further from shore to avoid stakeholder conflicts and open greater space availability for industry expansion, and the system is designed to be mobile to take advantage of avoidance capacity if a harmful algae bloom or other environmental contaminant is threatening.

In order for the deep-water MAP system embodiments to be mobile and located further from shore, these systems were engineered to adhere to naval buoyancy standards and be capable of withstanding significant environmental exposure without a loss of function or stability. Even if engineered to withstand the seasonal unpredictability of New England weather, the platform could still be designed as a flat structure, as long as there was sufficient roof space overhead for the solar panels and wind turbines. However, after having discussions with the permitting authorities (Bourne, MA Harbormaster, Falmouth, MA Harbormaster, Mass. Division of Marine Fisheries), it was assured that if the platform does not fit aesthetically with the coastal environment, permitting would be an issue. Therefore some embodiments of the 4 module platform are designed to appear like a Chesapeake-style deadrise vessel, even though the function is simply a catamaran floating design housing the shellfish. In most embodiments, the system is moved so infrequently, there are not even permanent controls and there are no motors located on the platform, as the system will be either towed with an existing vessel, or outboard motors will be brought to the platform, and installed on the brackets located on the stern (FIGS. 5A-5B). The only difference from an open catamaran with a roof is the aluminum pilot house at the front, which is simply an aesthetic consideration to ease permitting concerns. In one embodiment, the system includes the power capacity to run each of the 8, ⅓ hp DC motors 24 hrs every single day which will require 13.8 AH per module (at 24 VDC), which will cover approximately 100 square feet. There is 800 square feet of room above the platform, which will be ample room above the for all of the solar required to power four pumps 24 hr per day, as well as additional capacity for powering the winches and data collection system. Offshore environments also provide opportunities to utilize resources such as wind. By utilizing solar and wind, a self-contained embodiment will be independent of any non-renewable energy sources, further increasing its autonomy and reduction of operation costs.

Sensing Mechanism

The present invention provides for sensing at the external environmental, at the growth substrate mechanism and in the supporting sub-systems by the optional sensing mechanism. The sensing mechanism may comprise any sensor or sensors as known in the art. In one construction, the sensing mechanism comprises at least one EXO3 multi-parameter Sonde instrument, commercially available from YSI Inc. of Yellow Springs, Ohio. The sensing mechanism enables monitoring of any desired condition, most often temperature, dissolved oxygen, chlorophyll a (food availability), and flow velocity. The sensing mechanism may comprise of multiple sensors located at different sites around the system, including at the liquid delivery mechanism input, and at all or some growth substrate modules. In further embodiments, the sensing mechanism comprises a movable sensing mechanism capable of moving to all desired locations.

Control Mechanism

In some embodiments a control feature is incorporated into the system along with the sensing mechanism. In these embodiments, the system further comprises a controller (e.g., a microprocessor and/or a central processing unit also referred to as a CPU), that is informationally connected to the sensing mechanism and to the liquid delivery mechanism. Based on defined measurement thresholds (determined by either the farmer or by a program), the controller analyzes information received from the sensing mechanism and manipulates the liquid delivery mechanism accordingly.

Information Transmission Mechanism

The innovative system further provides an optional information transmission mechanism enabling real-time data transfer, remote monitoring and control of the system. The information transmission mechanism is at least informationally connected to at least one of the sensing mechanism, the control mechanism and/or the liquid delivery mechanism. The information transmission mechanism obtains at least a portion of information or data from these interconnected mechanisms and transfers it to a remote location by means of a data link. In the vast majority of embodiments, the data link is wireless. The data link may be accomplished by any means currently known in the art (e.g., the cellular network, satellite link, or fiber optic cable).

The transmitted data is configured to be machine readable and displayable to a user (e.g., a computer or phone). In some embodiments, the information transmission mechanism enables two-way communication, receiving information from a user or external program and transmitting the data to the interconnected control mechanism. In these embodiments, the received information can be utilized to operate interconnected components. One example being, an external user receives information from the system, changes a parameter of the liquid delivery mechanism (e.g., flow rate, flow direction, etc.) through the external interface, which then instructs the control mechanism to alter the liquid delivery mechanism's operation. Another example would be to change a parameter of the sensing mechanism (e.g., measurement frequency).

In certain constructions, environmental parameters including flow rate, dissolved oxygen, water temperature, and chlorophyll external of the platform, and exiting each module will be monitored. Real-time readings of the different data points will be sent to the cloud via cellular network, which can be visualized in a web-based software solution, as well as an app, with customizable alerts and chart options FIGS. 6A-6D illustrates the transmitted information as transformed by a monitoring control application (app) as known in the art for one system according to the present invention.

Overcoming Biofouling

Biofouling is a serious issue in shellfish aquaculture, as it reduces water flow, can hurt the aesthetic value of a cultured product, and results in higher labor costs overall to deal with the fouling. Biofouling can clog the mesh of the gear in which the shellfish are grown, thereby restricting water flow, which means reduced nutrient delivery (e.g., oxygen and microalgae), directly reducing the growth and survival of cultured organisms. As a result, biofouling mitigation may account for as much as ~15% of total annual operating costs for shellfish growers in the US, with total costs exceeding $21 million. A currently utilized, standard practice for gear-based oyster aquaculture is brining (90%+ saturated brine solution; 400 g NaCl/L) to control disease, pests, predators and biofouling. Brining takes significant time and labor because the protocol is to dip the oysters for 15 min, with a 15 min drying time for all oysters through every growth stage after they reach 15 mm. In embodiments that require anti-biofouling treatments, each tray pack can be easily tumbled to chip new shell and prophylactically dipped into a brine bath individually, on a set schedule. This will kill all fouling organisms such as tube worms, *Polydora* spp., and barnacles, ensure high product quality by killing boring sponge, and remove any issues associated with reduce flow by restricting tunicate growth as well. In further embodiments, each module in the system is moved and placed into a brining mechanism as a whole. In even further embodiments, the liquid delivery mechanism is configured to deliver brining solution to the growth substrate mechanism.

Growing most shellfish (oysters, scallops, clams, etc.) is essentially a four-step process: 1) hatchery where the broodstock is spawned and the shellfish is grown from larvae to post-set seed; 2) 1-2 mm seed is sent to the farm for the nursery phase; 3) once the shellfish has grown large enough in the nursery (5-15 mm), it is brought to the growout site for intermediate growout from post-nursery to near-market size (50 mm); and 4) final growout either on bottom, or in larger mesh gear until the product is ready for market. This current disclosure is designed to improve mostly on steps 2-4, as the hatchery process is relatively optimized, and is not principally limited by available lease areas or high gear and manual labor costs. The present invention aims to optimize the technology and platform for a farm to produce shellfish (oysters, bay scallops, etc.) from 1 mm seed through market product all within the self-contained system.

In current practice, the gear generally required to grow oysters from 15 mm through 50 mm (prior to final growout to 75 mm market size) takes up over 65% of the total gear on a farm, and the majority of the labor costs. If it was possible to eliminate all of the gear for the nursery and intermediate growout phases, the labor savings would be significant. The end result of the present invention is immediately useful to the majority of shellfish farmers in the United States, and would not require additional skills, and in many cases, would not require any additional permits or leases, while greatly increasing efficiency, as well as survival and growth of the shellfish.

Example I

A specific embodiment will now be exemplified with several phases of experimental development, some of which are prophetic. The phases that have already occurred are in the past tense and the prophetic phases are referred to in the future tense. A Phase I experimental effort focused on two main objectives to evaluate the MAP concept: biological viability, and monitoring capacity. To evaluate the biological viability of the system throughout the culture cycle, four distinct trials were performed, with both eastern oysters and bay scallops, each for 30 days in June, September, October and November, 2017. Upwellers and downwellers have been demonstrated to be effective in shellfish aquaculture, and are standard industry protocol from shellfish size 1 mm through 30 mm. However, shellfish have never been raised to market size in an open-water system where flow is manipulated and, therefore, the shellfish utilized in the experiments were all between 30 mm and market size (75-90 mm). In each of the trials, the shellfish were stocked at three different densities relative to standard industry stocking densities (1×), and either 5 times greater (5×) or 10 times greater (10×) (Table 1), and deployed in either APDI bags in bottom condo cages (standard industry protocol), or in a tray within one of the tray packs within one of Ward Aquafarms' downweller systems. After 30 days, the ADPI bags were retrieved and the tray packs were removed from the downweller. Both bay scallops and oysters were analyzed for survival, shell height and volumetric increases.

TABLE 1

Implemented stocking densities (number of individuals/m$^2$) of bay scallops and oysters for experimentation for phase one using bottom condo cages and downweller systems.

| Species | Stocking density | Species | Stocking density |
|---|---|---|---|
| Oysters | 1X 150 | Bay Scallops | 1X 100 |
|  | 5X 750 |  | 5X 500 |
|  | 10X 1,500 |  | 10X 1,000 |

In all trials, the oysters and bay scallops were stocked at up to 10 times normal stocking density, and regardless of treatment, survival was very high (>90%), and no statistically significant differences were observed in mean percent survival in any of the trials for bay scallops or oysters (ANOVA, $\alpha=0.05$, two-tailed P-value=0.5111, $R^2=-0.02992$). This means that if dissolved oxygen and food availability are kept high by increasing flow, both oysters and bay scallops can be cultured at a much higher density that was is standard industry practice, which can lead to much greater efficiency. Throughout all of the four bay scallop trials, the overall finding was that the 5× downweller treatment outperformed all other treatments consistently throughout the size range sampled from 27.2 mm-45.4 mm. For example, in the first trial the bay scallops in the 5× downweller treatment had a mean growth rate of 0.20 mm/day (SD, 0.21); which was significantly greater than all of the other treatments ($\alpha=0.05$, Wilcoxon Ranked Sum, P=0.00028, df=5). At the conclusion of the fourth trial, the shell height of the bay scallops in the 5× treatment was 42.2 mm (SD, 4.5), which was significantly bigger than the shell height of the bay scallops in the 10× bags, 5× bags, and the 10× downweller treatments (Tukey HSD, α=0.05, df=5, 174, P=0.0000752). This means that through overwintered market size, bay scallops can be grown at high concentrations, at 500 per $m^2$, which is 5 times greater than standard industry stocking densities, given the flow is increased and food and dissolved oxygen concentrations are sufficient.

Throughout all of the four oyster trials, the overall finding was that there were no differences between the oyster downweller treatments, and that volume is the limiting factor when increasing flow to maintain optimal conditions. For oysters at the conclusion of both the first trial and at the end of the final trial, neither the mean growth rates of the oysters (ANOVA, α=0.05, two-tailed P-value=0.7159, $R^2$=−0.0119), nor the final mean shell heights of oysters vary between treatments (ANOVA, α=0.05, two-tailed P-value=0.791, $R^2$=−0.01474). The oysters could be stocked as high as 1,500 organisms/$m^2$, which is 10 times higher than what industry practice for standard extensive ambient flow culture, without any reduction in growth or survival. However, the tray volume of 0.3 $m^3$, was almost completely filled at the end of the final trial, and even though the lack of significant growth rate differences would indicate that stocking density could be increased, at the current flow rate, and food and dissolved oxygen, the volume available has been maximized.

Increasing the stocking density requires greater vigilance over the system to ensure that the animals are consistently supplied with ideal growing conditions. To that end, a cloud-based software platform can be utilized to store incoming environmental data, display it to the farmer and send alerts to the farmer based on user-specified thresholds. The term "silo" refers herein to a unit to be monitored, such as an individual module or a column within a selected module. In one construction, a testing downweller was equipped with 4 YSI EXO3 sondes (one incoming water flow, three silos exiting water flow), which each measure water temperature, dissolved oxygen, and chlorophyll a (food availability), and 4 Flo-Tec flow velocity meters (1 incoming and three silos exiting water flow). From June through December of 2017, Ward Aquafarms collected real-time water condition data at the downweller using the sensors, which was then sent through a NexSens X2 data logger, over Verizon cellular to be stored remotely in the cloud. Ward Aquafarms setup a data repository on a Amazon Web Services (AWS) account, which also stores the app code to display the data to the user. Working with a software consulting firm (Zco, Nashua, NH), the app was developed for iOS to monitor chlorophyll, temperature, dissolved oxygen, and flow rates (FIGS. 6A-6D). Following a splash screen, a main screen shows the different incoming data streams, and the user can click on the dots above to switch between sensor (incoming, or the 3 different silos), such as illustrated in FIGS. 6A-6E. The next available screen is the graphing function for either 24, 48 or 72 of the most recent hours, which is automatically re-scalable given the data to be displayed. The final screen (not shown) accesses the settings, where the user can set thresholds for each of the different water parameters, set the number of alerts, frequency, and either through email or text.

While the modules are the areas where the shellfish are maintained throughout the culture period, the supporting structure (e.g., the platform) surrounding the modules is what enables the MAP system to be flexible and optimized to fit the specific configurations at each farm. The platform includes all of the aspects of the MAP system surrounding the modules, including the flotation, power generation and storage, backup power, staging area for farming activities, mooring connections and the ability to move the entire system to a new farm location given impending environmental conditions.

The results from the Phase I project demonstrate that both eastern oysters and bay scallops can be cultured at high densities (5× and greater of current practices) through market size, provided the system distributes sufficient quantities of food (microalgae) and dissolved oxygen to the shellfish. Even with the high stocking densities, there were no significant reductions in microalgae quantities or dissolved oxygen per unit volume given the standardized flow rate.

A Phase II effort could utilize the same stocking densities as determined in the Phase I project, while significantly increasing yield from the modules by increasing the number of trays utilized per pump, per module. High growth rates, survival and shellfish condition index must be maintained while scaling up to commercial yields, and therefore the underlying engineering will be evaluated and optimized.

Success of the proposed Phase II platform will be determined by growth, survival and product quality for shellfish stocked at the above high densities from 2 mm through final market size (75 mm), in standard 90-tray modules. After construction of the platform, the four modules, and the tray packs, biological testing will start, and will run for 16 months to sufficiently evaluate the health and growth of both oysters and bay scallops in the system.

The monitoring and control platform developed through the Phase I effort set the framework and developed the working model for optimization in Phase II. The same water temperature, dissolved oxygen, chlorophyll and flow rate sensors will be utilized in Phase II, and the system is already set up to accept and display those parameters. The control and automated alert functions have been designed, tested and are fully functional in the app, and will require no additional modifications for Phase II. Additional monitoring functions (power) and feedback (oxygen) will be incorporated to enhance functionality and reduce risk for farmers utilizing the MAP system.

Novel permitting strategies will be pursued that will enable streamlined regulatory requirements. Without any additional permitting, the platform can be installed on any shellfish farm in Massachusetts (or in most states), with a standard mooring on a permitted farm site. Shellfish farms are typically permitted under Massachusetts General Law chapter 130 Section 57 and 69, which is associated with a particular farm site. However, since the platform is mobile and does not need to be set in one fixed location, the platform can be permitted through 322 CMR 7.01 under a Class 4 permit, which, "Authorizes an open water system with minimal structures and no feeding," This means that anyone who would like to own a MAP system, could simply apply for a Class 4 permit, and not have to go through the Army Corp of Engineers, state Department of Environmental Protection, and many other agencies which must be consulted under the current permitting regime. This will open up many more opportunities for new entrants to the industry since the platform will be permitted directly similar to a fishing permit, instead of having the farm be tied to one particular location.

The price and configuration of the MAP system will depend on factors specific to the farm location and farmer desires. A Phase II platform for further experimentation with culture methods would utilize the two-module system 500, FIGS. 5A-5D and, in an alternative system according to the present invention, would utilize at least four modules which go to 1.5 m depth, though a commercial farmer may build a MAP system with 10 or more modules that go to 3 m depth, or any other configuration. Naval engineering and platform construction can be contracted to whomever the client desires, though locally, the naval engineering has been contracted through a firm in Rhode Island (Matt Smith, Naval Architect, LLC, Barrington, RI), and platform construction can be contracted through New England Boatworks (Bristol, RI). Due to the relatively simple platform design, a 4-module system can be constructed in 4-6 months, including 2 weeks outfitting sensors and doing sea trials.

In one construction of a four-module platform, a minimum of 2 ft of freeboard under standard operating conditions, fully loaded with shellfish, is provided. The platform without any modules weighs 7,763 kg, and the two 12.8 m hulls each have a volume of 9.4 $m^3$, which displaces a total of 19,286 kg. Each module with trays weighs approximately 450 kg in water, which leaves 2,436 kg for shellfish in water per module. There will never be a time when all of the trays in all of the modules are full with market product, as marketable oysters will be sold, and the culture space replaced with smaller oysters to continue growing. However, even if that were to happen, each module with 117,000 market oysters (1,300 $m^2$), would weigh 2,106 kg in water. Ward Aquafarms will work with Matt Smith (Naval Architect, LLC) and New England Boatworks during construction, sea trials, and throughout module installation to ensure buoyancy calculations are accurate. Every 30 days from when the MAP platform is launched through the following 16 month experimental period, the MAP system will be monitored for buoyancy calculations. The FloWav flow meters utilized for water velocity data in the monitoring app send depth data at each sampling point (every 5 minutes), though the depth information was not used in Phase I. In Phase II, the depth data collected every 5 minutes will be correlated to shellfish growth for each module. Every 30 days a representative sample of 3 trays per tray pack (33.3% of total volume) will be quantified for total volume, and a subsample of 2 L per tray sampling for live/dead and measured for shell height, and each shellfish weighed, in shell. By calculating total volume, and weight, the total in-air weight per module can be calculated and correlated to changing depth information. In this manner, the initial depth (freeboard) will be known, and total weight increases per 30-day increment, which will allow Ward Aquafarms to monitor buoyancy changes as the shellfish grow, and calculate total carrying capacity for the platform given known shellfish densities and weights throughout the culture cycle.

The entire MAP system, including the pumps, monitoring and control system and all associated sensors will be powered by a 24 VDC system. Twenty-two, 350 watt solar panels will be installed on the roof, the platform will be moored in the middle of a bay, with no structures around to shade of impede light reaching the panels, and the four 3 kW wind turbines will be subject to daily southwest winds in the afternoon in southeastern New England coastal waters. However, in order to be conservative, the total charge time per day for the solar panels is 2.6 hrs and 1.0 hrs for the wind turbines. With this low rate of charging, the renewable energy alone would completely power the entire system, and there are 16, 8 D AGM (255 AH each) batteries to store excess capacity and power the system in times of low wind or solar power. If there came a time when the renewable sources were unavailable for long periods of time, there will be a 5.5 kW generator in the portside hull, which can power the system, and recharge the 2,040 AH battery backup system in 10.2 hrs. The four bilge pumps located in the hulls, telemetry, water quality sensors, deck lights total 12.7 AH/day, and each module uses 13.8 AH (6.9 AH per motor, two per module) which is 55.2 AH per day total. The battery bank alone can power the entire system for 37 hrs. Even if there is an issue with the solar, and there is an issue with the wind turbines, and with the generator, the battery backup system is designed to provide sufficient power to buffer the period when the outage is being fixed. The system has been designed to function as stated above, though actual power requirements when installed may be different than expected. By quantifying the number of watts produced per renewable energy system, per day, and quantifying the amount of watts consumed per module, the sustainability of the system power requirements can be determined. The watts used per system should be relatively constant, whereas the amount of watts generated through solar or wind will differ depending on ambient weather conditions. A ratio of generated-to-consumed power can be calculated for each day the platform is moored away from supplied shore power (typically May-October in New England), in order to modify power consumption and generation practices for commercial production.

Each module has been designed to have 2, ⅓ hp 24 VDC electric motors, which are more efficient than AC motors, and ideal to be powered by a 24 VDC renewable power system. The two motors each draw 13.8 amps under full load, and the system has been designed to have each of the motors receiving half power (6.9 amps). This is principally for two reasons; to spread the area where water is being drawn from across the module, and so that if there is an issue with one motor, the other can continue to operate until the broken motor can be replaced. The two motors running on half power (13.8 amps total) will move 3,400 L per minute. The culture area within each module is 7.6 $m^3$ (7,645 L), which means the entire system culture water will be recycled every 2.2 minutes, which results in a flow rate of 1.5 cm/sec laterally across the shellfish at all times.

Total water flow is useful for designing the system and sizing motors; however, in order to create the ideal environment for the shellfish in the system, it is important to evaluate flow per tray, not simply overall. If flow is being unevenly directed to a certain section of the tray pack or culture area based on stocking density or mesh size, it is important to determine where the issues arise. Falmouth Scientific, Inc. (FSI) has been creating oceanographic sampling equipment since 1989, and is a leader in high-accuracy acoustic current meters which are suitable for use with the present invention. In one approach, small-form acoustic flow sensors measure flow between two probes spread at either side of a tray. In this way, the system measures flow within the 4 inch high trays, and measure 10 discrete flow measurements throughout the tray pack. The 10 flow sensors preferably interface with the NexSens data logger, which is utilized for the remote monitoring system, and will allow the data to be visualized on the same interface as the water quality sensors. This will allow for side-by-side comparisons between different water quality parameters and flow rates throughout the modules. Each month from when the modules are incorporated into the MAP system (May 2019), through the following 16 month experimental period, the 10-sensor flow meter setup will be installed on the three inward facing tray packs on either an oyster module or a bay scallop module, which is then switched every 30 days (FIGS. 2A-2B). By placing the flow meters strategically on the 3 inward facing tray packs between 10 distinct trays within a module, hydrodynamics within the system can be evaluated. The flow data will be input into FSI's proprietary ACMProPlus flow visualization software to identify areas of low flow relative to equal flow distribution across the system. Every 30 days the 10-sensor system will be moved to a new module, and the flow data from each sensor from the previous 30-day period will be averaged into discrete 24 hr periods for comparison. If there are areas of low flow determined through this sampling, the module will be examined for clogging, over or under stocking, mesh fouling issues, or any other aspects which could cause modified flow. If there are areas of low flow identified, the 10-sensor setup will stay on the same module for another 30 day period, and the tray orientation will be modified to correct the issue. If there are no flow issues found, the 10-sensor setup will be installed on the next module within the system.

In the Phase I project, year-two oysters, and year-one and two bay scallops, were successfully grown at high densities over 4 separate 30-day trials, comprising water temperatures from 19.9°-5.9° C. (June-December), and shell heights between 52.3-70.8 mm for oysters and 27.2-56.2 mm for scallops. The survival was high in all treatments, though for the greatest efficiency (yield per unit volume), it was determined that year-two market size oysters can be stocked at 1,300 $m^2$, and bay scallops can be stocked at 500 $m^2$, with equally high survival and as good if not better growth rates than shellfish grown at lower densities.

Over the past five years, oysters within the nursery systems at Ward Aquafarms have achieved growth rates of 0.30 mm/day, and bay scallops have achieved growth rates of 0.60 mm/day over the entire nursery period from June-September from 1-30 mm shell height. Growth and survival data has been collected for oysters and bay scallops regularly for the past five years over a range of stocking densities in ½" mesh cages, ¾" mesh cages, mesh bags on the bottom as well as the surface for mesh sizes from 4 mm through 20 mm for all sizes of shellfish from 30 mm through 75 mm at the Ward Aquafarms growout site (Ward Aquafarms, internal data). Growth rates and survival are known for stocking densities of oysters and bay scallops under normal low-density commercial farming conditions, and these values, in addition to the results from the Phase I project, will serve as benchmarks for comparing the success of the high-density farming techniques proposed in this project.

Success of the proposed Phase II platform will be determined by growth, survival and product quality for shellfish stocked at the above high densities from 2 mm through final market size (75 mm), in a standard 90-tray module (FIGS. 2A-2C). After construction of the platform, the four modules, and the tray packs, biological testing will start, and will run for 18 months to sufficiently evaluate the health and growth of both oysters and bay scallops in the system. In certain embodiments two of the modules will be used for oyster culture, and two of the modules will be used to culture bay scallops. In order to maintain year-round revenue, the platform has been designed to accommodate two year classes of each species, which will allow for sales of year-two product, and sufficient space for year-one product to continue growing. Producing two species with differential handling requirements for oysters (3-6 times per year) as compared to bay scallops (1-2 times per year), will assist farmers in increasing output and revenue, without adding labor costs given the more efficient MAP design.

Examples of Alternative Embodiments

In one embodiment, two oyster modules will be stocked with 250,000 year-two oysters (50 mm average shell height) and 500,000 year-one oysters (2 mm average shell height). At the same time, the bay scallop modules will be stocked with 50,000 year-two bay scallops, and in July when seed is available, the other module will be stocked with 200,000 year-one bay scallops (1 mm average shell height). The year-two oysters and scallops will be stocked at final densities (1,300 per $m^2$ oysters, 500 per $m^2$ scallops), and maintained at those densities through final harvest. Year-one animals will be kept at double standard stocking density through the first 12 months, at which point the stocking densities will be halved to reach final stocking density.

Comparison oysters and bay scallops will be stocked into triplicate standard (rack and bag) cages at standard (130 per $m^2$ oysters, 50 per $m^2$ scallops) stocking densities and will be deployed per normal commercial farming operations at the growout site adjacent to the MAP system. Every 30 days, all standard commercial growout bags and three representative trays from each module will be sampled for performance comparison. Total volume will be collected be unit, and a subsample (2 L) will be taken from each replicate in each treatment, and all shellfish measured for shell height using a caliper by the research technician, and both live and dead shellfish will be enumerated for survival analysis, individual weight for each shellfish (in air), and then the meats will be shucked and dried overnight at 25° C. for dry weight condition index measured. The research technician will compare growth, survival, flow rates and assess differences in growth and survival as they relate to the four different stocking densities. All results will be compared with either a one-way or two-way ANOVA, with post-tests, as appropriate.

Year 2

The shellfish remaining in the modules following the year-one sampling will remain under standard operating conditions until they are large enough to be sold. In May of 2020 the two oyster modules will be again stocked with 500,000 year-one oysters (2 mm average shell height). In July, when seed is available, the bay scallop modules will be again stocked with 200,000 year-one bay scallops (1 mm average shell height). Year-one animals will be kept at double standard stocking density through the first 12 months, at which point the stocking densities will be halved to reach final stocking density. Comparison oysters and bay scallops will again be stocked into triplicate standard (rack and bag) cages at standard (130 per $m^2$ oysters, 50 per $m^2$ scallops) stocking densities and will be deployed per normal commercial farming operations at the growout site adjacent to the MAP system. Every 30 days, all standard commercial growout bags and three representative trays from each module will be sampled in an identical manner as year-one and all results will be compared with either a one-way or two-way ANOVA, as appropriate.

Monitoring and Control System Performance:

In some constructions, the monitoring and control platform includes water temperature, marine-rated chlorophyll a sensor (YSI 6025 Chlorophyll Sensor; Yellow Springs, Ohio), a marine-rated dissolved oxygen probe, which will also measure water temperature (YSI 5239 Dissolved Oxygen Probe; Yellow Springs, Ohio; YSI EXO3 sonde) and flow rate sensors (FloWav) "sensor pack" will be purchased in Phase II, and the system is already set up to accept and display those parameters. Each module will have a sensor pack installed within the area behind the tray packs where the pumps are located, which will cause the system to measure food availability and dissolved oxygen after the water has gone through the shellfish culture areas, and will allow for depth and flow rate comparison between modules over time (Obj. 1). The app will need to be modified to change the silo titles, though aside from titles, the working app from the Phase I effort is already ideally designed for the Phase II effort. In subsequent Phase II work, the app will be differentiated to each farm with a unique splash screen with the business logo, and distinct user-customizable backgrounds following individualized login pages.

The sensors feed to an integrated data logger (NexSens, Fairborn, Ohio) which has telemetry capacity (Verizon SIM cards owned by Ward Aquafarms) to simply and cheaply transfer the incoming data to the AWS cloud-based storage. The automated alert functions have been designed, tested and are fully functional in the app, and will require no additional modifications for Phase II. Additional monitoring functions (power) and feedback (oxygen) will be incorporated to enhance functionality and reduce risk for farmers utilizing the MAP system. Each ⅓ hp 24 VDC pump (Leeson Metric IEC-Frame 108373; Grafton, WI) will have a power cable which will feed into an associated digital control box (Teco Variable Frequency Drive L510-201-H3-N; Teco Westinghouse, Round Rock, TX) which can take logic output from the app to change frequency, and therefore pumping output. Power utilization (watts) data per motor, at each sampling period (every 5 minutes) will be transferred to AWS to be displayed on the app. When the quantity of power (watts) for a given sampling period has deviated 10% from the reading prior, an alert will be sent to the farmer to monitor and evaluate the issue.

Figure 6A:
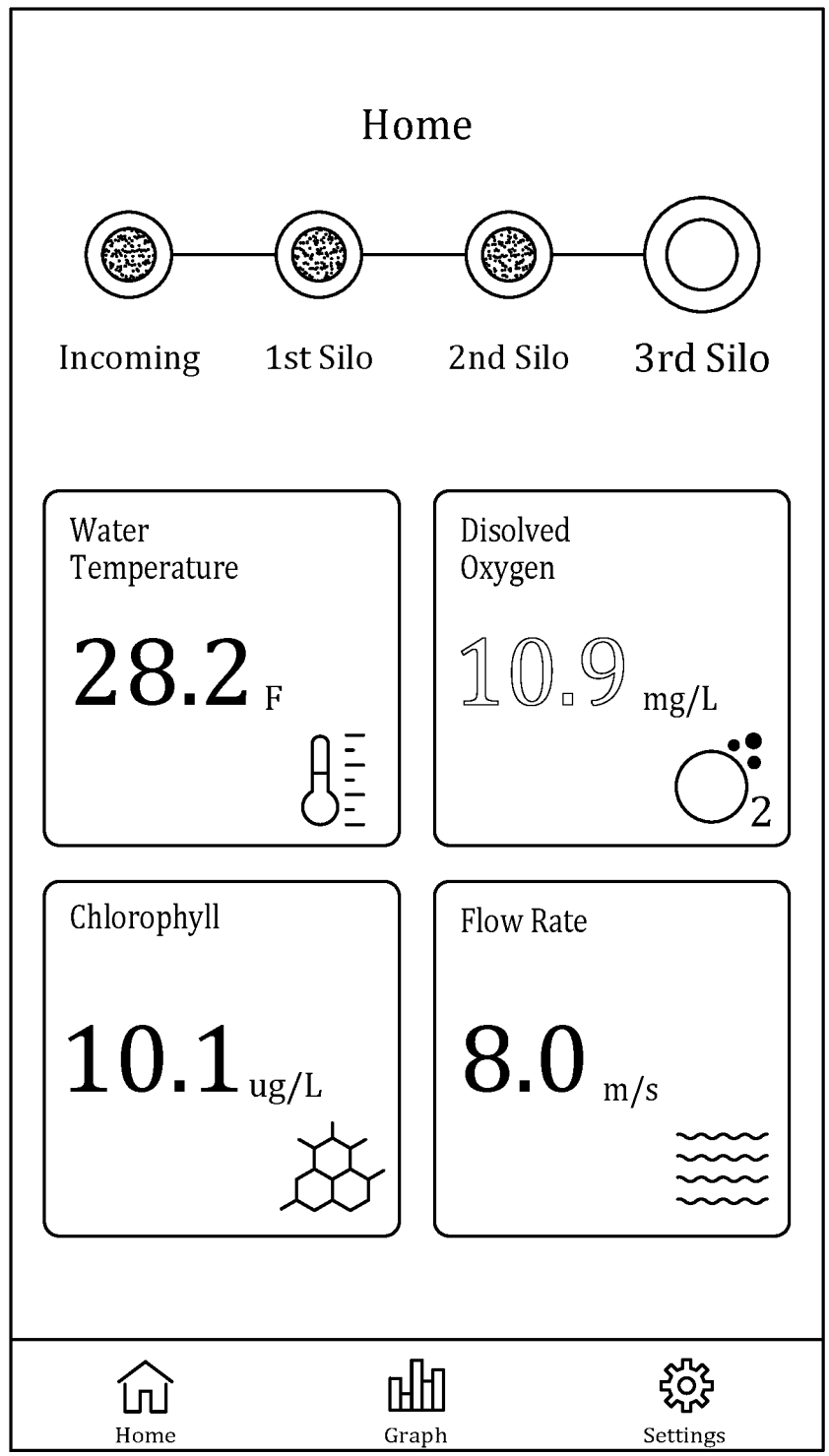
FIGS. 6A-6D are screenshots of one embodiment of a monitoring and control application, with FIG. 6A showing a Home screen displaying water temperature, dissolved oxygen, chlorophyll and flow rate, which can be viewed for each silo (e.g., module)
Figure 6B:
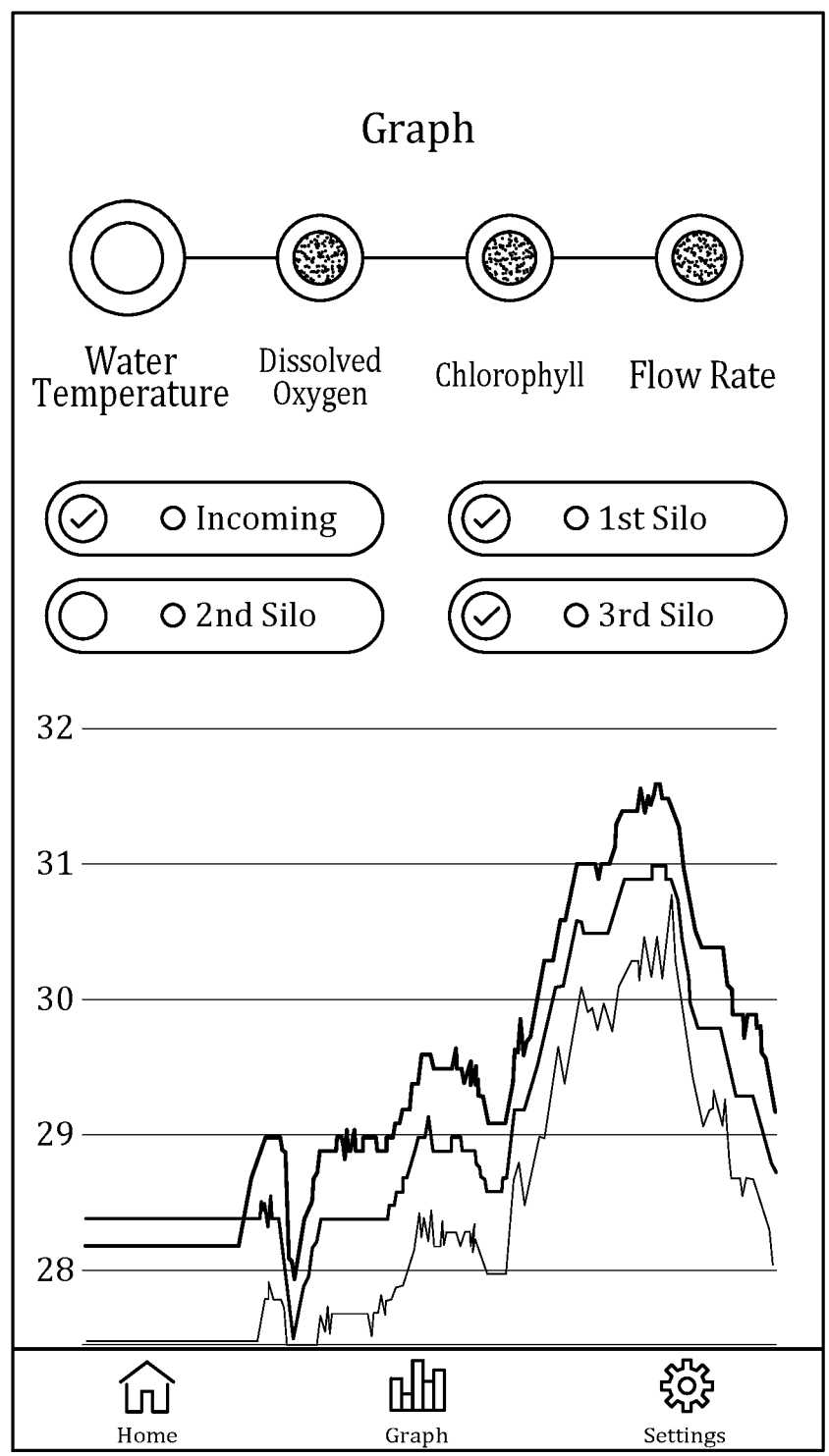
Figure 6C:
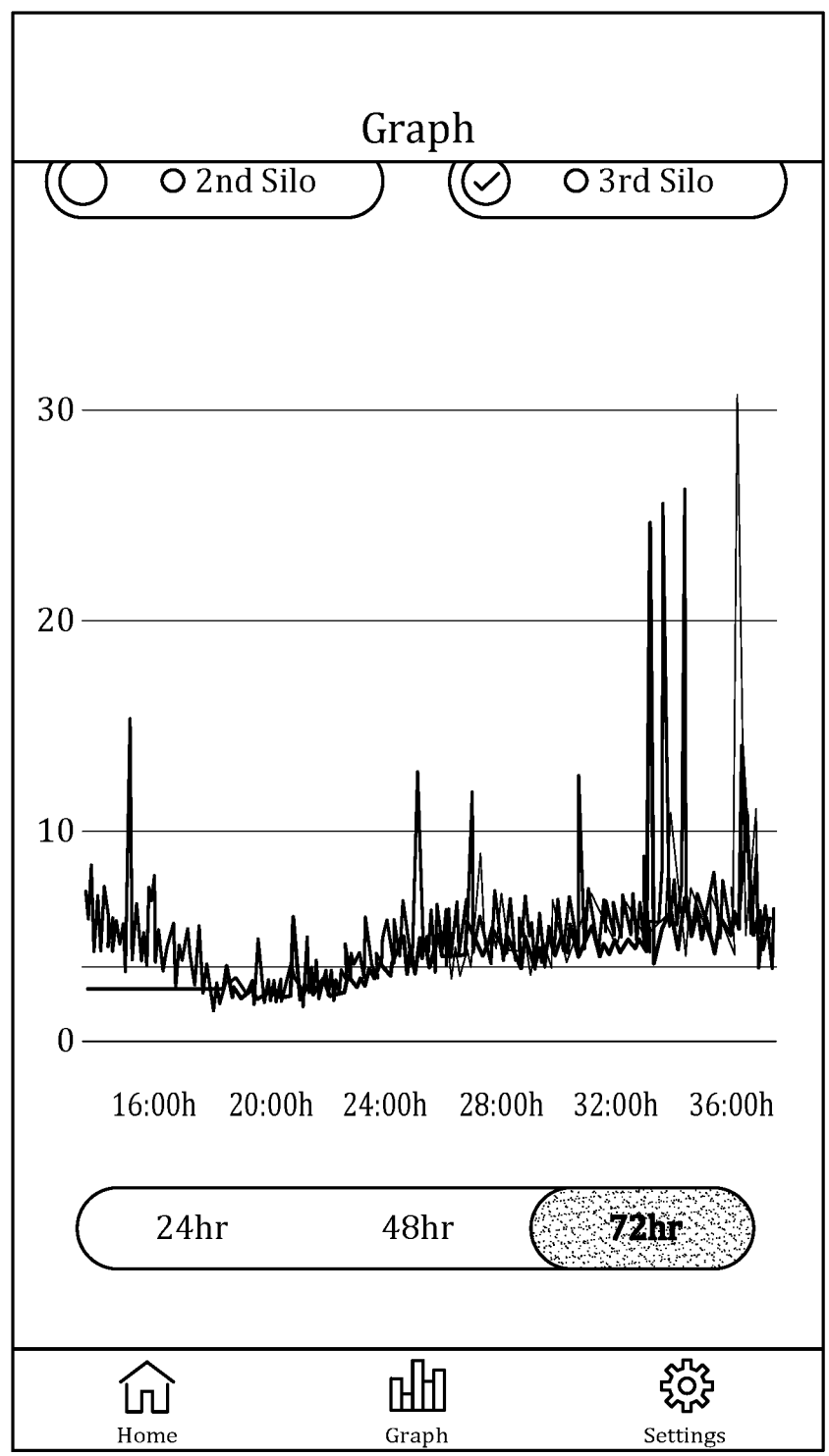
Figure 6D:
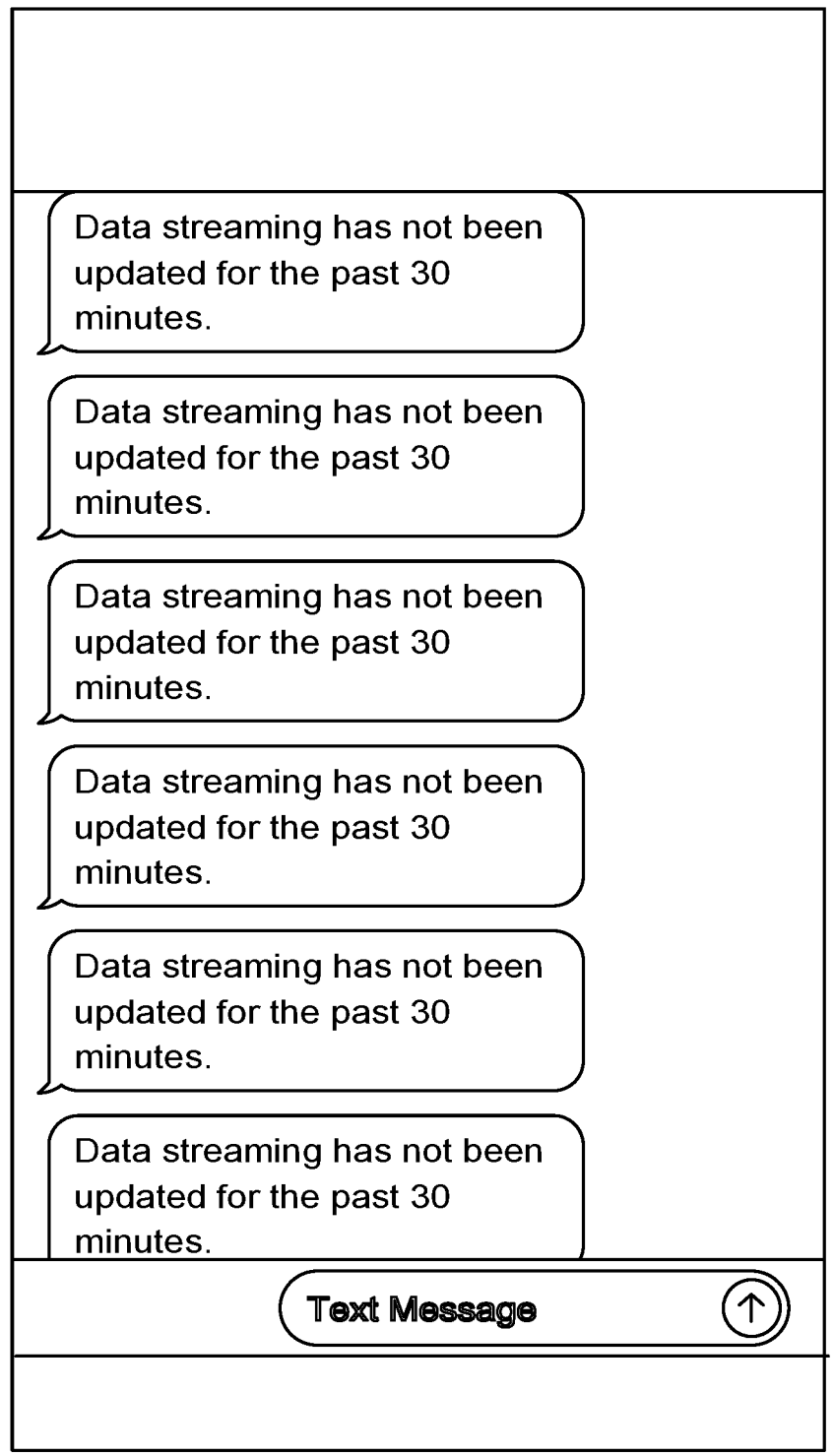
Figure 6E:
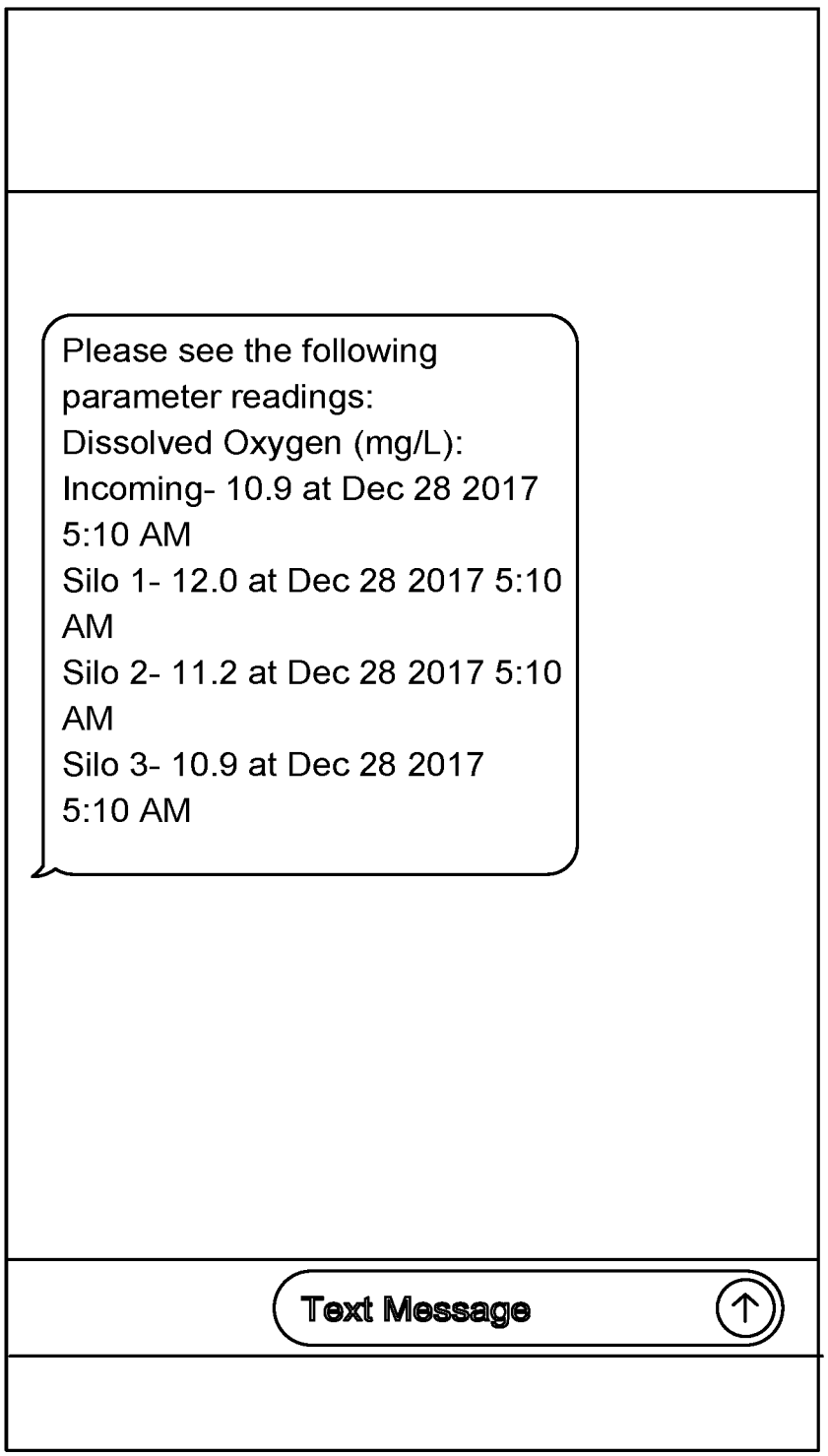
FIG. 6E is a screenshot of an alert from a shellfish nursery monitoring application.

Through the Phase I effort, it was determined that with consistent flow rates (at or above 1.2 cm/sec), both dissolved oxygen and chlorophyll were not significantly reduced under any circumstances or with any species, even at the high stocking densities. However, if there is an issue with a pump, or any other potential problem which causes flow to cease for a period of time, the high stocking density means that the dissolved oxygen within the culture modules could be reduced rapidly. For this reason, automated backup dissolved oxygen supplementation systems will be integrated into each module. This will include air diffusers installed directly below the tray packs within each module, and an air line running to four distinct blowers (one per module), which are independently powered, and backed up with independent power supplies. If the dissolved oxygen concentration is reduced below a user-customizable threshold, or if the emergency blower setup does not maintain a connection to the app feedback system, the blower will automatically turn on and supply air to the shellfish until the issue can be remedied. In the Phase I effort, when data did not come into the app within the prior 30 minutes (indicating there is an issue with connectivity), an alert would be sent to the farmer notifying that there was a data update issue (FIG. 6E). In this way, the farmer will know the dissolved oxygen concentration at all times, and if for some reason the system is not communicating, the farmer will be notified and can go check the MAP system, knowing that the shellfish are being supplied with sufficient oxygen in the meantime. Every time the blower is turned on, an alert will be sent to the farmer as well. These alerts will be quantified every 30 days, and correlated to weather conditions, power usage and motor function. The app display will be expanded to include the additional metrics (power usage per pump, blower usage, total power generated, total power in battery backup), and those factors will be displayed to the farmer in a manner similar to the standard water quality data being displayed such as illustrated in FIGS. 6A-6D.

Systems and methods according to the present invention can satisfy at least three out of the four current USDA strategic goals. Shellfish aquaculture by and large, is currently restrained by available intertidal and nearshore subtidal lands without user conflicts, and therefore there is a limit on the sustainable jobs and healthy protein produced in this industry. By moving the operations further from shore, increasing pay for individual employees, and reducing risk to the farmer, the project will allow shellfish aquaculture operations to exist anywhere there is access to a coastline, which will address the USDA Strategic Goal #1: "Assist Rural Communities To Create Prosperity So They Are Self-Sustaining, Repopulating, And Economically Thriving". The present innovative system will also result in far greater agricultural production, farms that are more economically viable and will lead to an increase in food security as greater production leads to greater exports and lower prices for all, which addresses the USDA Strategic Goal #3: "Help America Promote Agricultural Production And Biotechnology Exports As America Works To Increase Food Security". By increasing production, prices will decrease per unit, which will make the healthy nutritious seafood produced through US aquaculture more available to those will smaller budgets for food expenses, thereby addressing USDA Strategic Goal #4: "Ensure That All Of America's Children Have Access To Safe, Nutritious, And Balanced Meals".

Example II

A second exemplification of one specific embodiment will be described herein. In the inventions' simplest form, the MAP system can be constructed and configured to operate attached to a dock, wharf or other shore-side structure. A dock embodiment may be constructed to have the growth substrate mechanism immersed in the aquatic environment by suspending, floating, anchored or attached to the dock, or resting on the fluid body bottom (e.g., sea-floor). If the system is secured to the fluid body floor, the dock embodiment may comprise an additional attachment mechanism to the dock. Dock and fluid body bottom attachment mechanism are incorporated in to the supporting structure in these embodiments.

The supporting structure in this dock embodiment comprises of hardened structural elements (e.g., metal support bars), and securing rigging. The supporting structure may also comprise additional floatation, but many times the growth substrate mechanism is resting on the sea-floor and no floatation is required. The supporting structure acts to secure and connect the growth substrate mechanism, liquid delivery mechanism and the optional sensing mechanism, control mechanism and information transmission mechanism as one coherent system.

In the dock embodiment, the liquid delivery mechanism directs the water adjacent to the dock across the secured growth substrate mechanism. With some docks, there is always sufficient water to pump across the growth substrates, however for some settings, the liquid delivery mechanism will further comprise the sourcing mechanism (e.g., a hose) to draw water from below the low-tide line and bring it to the growth substrate. In this specific embodiment the sourcing mechanism further comprises a filter, to prevent large particulate matter from entering the mechanism.

The growth substrate mechanism in the dock embodiment most often comprises the module built of tray and tray pack system as described above. These modules may be floated adjacent to the dock, suspended from the dock, or rest on the fluid-body bottom under or in close-proximity to the dock.

The dock embodiment of the present invention may also comprise the optional components of the system, including the sensing, the control, and the information transmission mechanisms. The sensing mechanism in the dock embodiment may comprise the four YSI EXO3 sondes as well as the flow sensors, as described in Example I. The sensing mechanism may be affixed to the supporting structure, or to simply to the dock. In this dock embodiment, a controlling mechanism is provided and is informationally connected to the sensing mechanism, and the liquid delivery mechanism. In this embodiment the controlling mechanism further comprises a human-readable display (e.g., a weather-proof LCD display) as commonly known in the art.

The controlling mechanism provides the user with the information gathered by the sensing mechanism, and an interface for changing parameters of the liquid delivery mechanism. In this particular embodiment, no information transmission mechanism is required for the system to function. However, in further dock embodiments, an information transmission mechanism may comprise a hard-wired datalink extending off the dock to an external computer, or any wireless datalink (e.g., cellular or wifi network). Typically dock embodiments are powered by existing infrastructure (e.g., electrical grid).

In the dock embodiment, the growth substrate mechanism may be accessed by raising the modules out of the aquatic environment by means of the support structure (further comprising a winch or pulley system), or by a user in the aquatic environment (e.g., a swimmer), or by a user accessing the modules during low tide from the fluid-body floor. The work surface in the dock embodiment is most often the dock or attached structure itself, and not contained in the inventive system. Furthermore, biofouling and other processes and associated tanks, reservoirs, supplies and etc. are located and used from the existing dock structure, not the system.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A self-contained, modular aquaculture system deployable in a body of water having a water column with an upper water surface and having a natural flow direction and a natural flow rate of the water, comprising:
   a plurality of containers, each container defining a plurality of openings through which water can be passed to flow water at least substantially laterally past a plurality of organisms;
   at least one carrier unit defining at least one chamber in which the plurality of containers are configured to be placed inside said chamber, each container capable of holding the plurality of organisms to be cultured, the chamber having a plurality of chamber inlets for water intake and a plurality of chamber outlets;
   support structure configured to be movable to different locations across the upper water surface and including sufficient flotation to suspend the at least one carrier unit in the water column while the organisms are cultured, wherein the support structure has a lift mechanism configured to raise and lower the carrier unit relative to the support structure and capable of raising the carrier unit sufficiently above the upper water surface to expose the containers to the atmosphere above the upper water surface of the water column;
   at least one water drive unit operable to actively alter at least one of the natural flow direction and/or the natural flow rate of the water to at least one of a changed direction and/or an adjusted flow rate through the at least one chamber and past the containers to improve growing conditions for the organisms while the organisms are cultured;
   at least one sensor to monitor at least one environmental parameter in the water column in proximity to the at least one carrier unit; and
   a controller responsive to the sensor to command the water drive unit to adjust the rate and/or direction of water flow through the at least one carrier unit to improve growing conditions for the organisms while the organisms are cultured.

2. The system of claim 1 wherein the water drive unit includes at least one impeller that is positioned to actively force water past the containers to exit from the chamber through the chamber outlets.

3. The system of claim 2 wherein the water drive unit includes a motor positioned on the support structure to rotate the impeller.

4. The system of claim 2 wherein the at least one impeller is positioned proximate to one of the chamber inlets or the chamber outlets.

5. The system of claim 1 further including a propulsion mechanism capable of moving the support structure and the at least one carrier unit to another location on the body of water.

6. The system of claim 1 wherein the containers are removably stackable and are secured as a plurality of stacks within the at least one carrier unit and, within each stack, at least some of the containers include alignment members, wherein the alignment members align with another container when stacked.

7. The system of claim 1 wherein at least some of the containers are stackable trays, each tray having (i) a top defining a top opening, (ii) a bottom and (iii) at least two sidewalls, with the bottom and the at least two sidewalls defining a tray volume and formed of a mesh material having first mesh size for that tray through which water can flow at least substantially laterally over organisms within the tray volume, and the top defining a majority of its area as the top opening.

8. The system of claim 7 further including at least one liner adapted to be removably placed in one of the trays through the top opening of the tray, the at least one liner formed of a material having a second mesh size that is smaller than the first mesh size.

9. The system of claim 7 wherein the top of each tray includes a rim formed of the mesh material, the rim defines the top opening and the trays are adapted to be assembled in at least one stack having at least a top tray and a bottom tray, and further including a removable lid defining a plurality of openings through which water can flow, and the lid being placeable on the top tray to completely cover the top opening of that upper tray in the stack, and at least some of the trays include alignment members, wherein the alignment members align with another tray when stacked.

10. The system of claim 9 further including at least one securement mechanism per stack to releasably hold the lid against the top tray and to retain together the assembled trays per stack, and the trays including alignment members have the alignment members attached to the bottom of the trays and interlocking with the top of another tray when stacked.

11. The system of claim 1 wherein the support structure includes at least one hull having a hull bow that is adapted to be moved across the upper water surface to change an initial operative location of the system to a different operative location.

12. The system of claim 1 wherein the at least one carrier unit defines the at least one chamber with an open framework to support the plurality of containers while enhancing water flow through the carrier unit.

13. The system of claim 1 wherein the at least one sensor is configured to monitor at least dissolved oxygen as the environmental parameter and the controller is configured to control dissolved oxygen within the chamber by commanding the water drive unit to adjust the rate and/or direction of water flow.

14. The system of claim 1 wherein the at least one sensor is configured to monitor at least chlorophyll as the environmental parameter and the controller is configured to control density of microalgae within the chamber by commanding the water drive unit to adjust the rate and/or direction of water flow.

15. The system of claim 1 further including at least a second carrier unit, wherein each carrier unit has a respective water drive unit operable to actively alter at least the natural flow rate of the water to at least an adjusted flow rate through a chamber in its associated carrier unit and past containers held therein to improve growing conditions for the organisms while the organisms are cultured therein, and wherein each carrier unit can be raised or lowered relative to the support structure by the lift mechanism.

16. A method of utilizing a self-contained, modular shellfish aquaculture system deployable in a body of water having a water column with an upper water surface and having a natural flow direction and a natural flow rate of the water, comprising:
selecting at least one carrier unit defining at least one chamber in which containers are configured to be placed inside the chamber, and the chamber having a plurality of chamber inlets for water intake and a plurality of chamber outlets;
selecting a plurality of containers sized to fit within the at least one chamber, each container defining a plurality of openings having a first average opening size for that container through which water can be passed to flow water past shellfish, and placing in each container a plurality of shellfish to be cultured;
selecting support structure configured to be movable to different locations across the upper water surface and including sufficient flotation to suspend the at least one carrier unit in the water column, and suspending the at least one carrier unit with the plurality of containers therein immersed in the water column while the shellfish are cultured, wherein the support structure has a lift mechanism configured to raise and lower the carrier unit relative to the support structure and capable of raising the carrier unit sufficiently above the upper water surface to expose the containers to the atmosphere above the upper water surface of the water column;
selecting at least one water drive unit operable to actively alter at least one of the natural flow direction and/or the natural flow rate of the water to at least one of a changed direction and/or an adjusted flow rate through the at least one chamber and past the containers to improve growing conditions for the shellfish while the shellfish are cultured; and
monitoring at least one environmental parameter of the water in proximity to the containers while the shellfish are cultured utilizing at least one sensor, and selectively operating the at least one water drive unit utilizing at least one controller to change the adjusted flow rate and/or the changed direction as needed to optimize readings of the at least one environmental parameter to improve growing conditions for the shellfish while the shellfish are cultured.

17. The method of claim 16 wherein the natural flow rate is mechanically altered to a desired mechanically powered flow rate as the adjusted flow rate utilizing at least one impeller that is positioned to actively force water past the containers to exit from the chamber through the chamber outlets.

18. The method of claim 17 further including selecting at least one liner adapted to be removably placed in one of the containers, the at least one liner formed of a material having a second plurality of openings having a second average opening size that is smaller than the first average opening size of that container.

19. The method of claim 16 wherein at least some of the containers are selected to be stackable trays, each tray having (i) a top defining a top opening, (ii) a bottom and (iii) at least two sidewalls, with the bottom and the at least two sidewalls defining a tray volume and formed of a mesh material having the first average opening size for that tray through which water can flow at least substantially laterally over shellfish within the tray volume, and the top defining a majority of its area as the top opening.

* * * * *